(12) United States Patent
Haley et al.

(10) Patent No.: US 8,135,576 B2
(45) Date of Patent: Mar. 13, 2012

(54) SYSTEM FOR ENTERPRISE KNOWLEDGE MANAGEMENT AND AUTOMATION

(75) Inventors: Paul V. Haley, Sewickley, PA (US); Peter D. Venable, Pittsburgh, PA (US); Albin L. Vareha, Jr., Monroeville, PA (US); Klaus P. Gross, Sewickley, PA (US)

(73) Assignee: Oracle International Corporation, Redwood Shores, CA (US)

( * ) Notice: Subject to any disclaimer, the term of this patent is extended or adjusted under 35 U.S.C. 154(b) by 1209 days.

(21) Appl. No.: 11/718,129

(22) PCT Filed: Nov. 14, 2005

(86) PCT No.: PCT/US2005/041311
§ 371 (c)(1),
(2), (4) Date: Aug. 21, 2007

(87) PCT Pub. No.: WO2006/068731
PCT Pub. Date: Jun. 29, 2006

(65) Prior Publication Data
US 2008/0097748 A1   Apr. 24, 2008

Related U.S. Application Data

(60) Provisional application No. 60/627,741, filed on Nov. 12, 2004.

(51) Int. Cl.
*G06F 17/27* (2006.01)
(52) U.S. Cl. .................. 704/9; 704/4; 704/257
(58) Field of Classification Search .............. 704/1–10, 704/257, 255, 251
See application file for complete search history.

(56) References Cited

U.S. PATENT DOCUMENTS

| | | |
|---|---|---|
| 5,404,506 A | 4/1995 | Fujisawa et al. |
| 5,555,408 A | 9/1996 | Fujisawa et al. |
| 6,292,771 B1 | 9/2001 | Haug et al. |

(Continued)

FOREIGN PATENT DOCUMENTS

EP   0542430 A   5/1993

(Continued)

OTHER PUBLICATIONS

Supplementary European Search Report for European Patent Application No. 01939495.6; dated Jun. 25, 2007.

(Continued)

*Primary Examiner* — Huyen X. Vo
(74) *Attorney, Agent, or Firm* — Kilpatrick Townsend & Stockton LLP

(57) ABSTRACT

The present invention is directed to a system for managing business knowledge expressed as statements, preferably sentences using a vocabulary, where such statements may be automated by the generation of programming language source code or computer program instructions. As such, the present invention also manages software design specifications that define, describe, or constrain the programming code it generates or programs with which it or the code it generates is to integrate. The present invention facilitates the creation of composite sentences. In one embodiment, the present invention also interprets a composite sentence as a logical formula in first order predicate calculus or similar logic formalism supporting conjunction, disjunction, and negation as well as existentially and universally quantified variables. The invention further interprets natural language, including singular common count noun phrases and connectives, as variables in formal logic. Further, the invention then implements the logical interpretations as rules.

20 Claims, 16 Drawing Sheets

U.S. PATENT DOCUMENTS 6,556,964 B2 * 4/2003 Haug et al. .................. 704/9
7,376,552 B2 * 5/2008 Hander et al. ................ 704/9

FOREIGN PATENT DOCUMENTS

WO    WO 01/90924 A1    11/2001

OTHER PUBLICATIONS

T. Wang, et al., "Active Rule Processing in the Biocompose Database," Proceedings International Symposium on Object-Oriented Real-Time Distributed Computing, Apr. 1998, pp. 431-437.

E. N. Hanson, "An Initial Report on the Design of Ariel: A DBMS with an Integrated Production Rule System," Sigmod Record, New York, NY; vol. 18, No. 3; Sep. 1, 1989, pp. 12-19.

M. Watanabe, et al., "CL: A Flexible and Efficient Tool for Constructing Knowledge-based Expert Systems," IEEE Expert, IEEE Service Center, New York, NY, vol. 4, No. 3, Sep. 21, 1989, pp. 41-50.

Supplementary European Search Report of Jun. 21, 2010 (7 pages).

International Search Report for PCT Patent Application PCT/US2005/041311 dated Aug. 29, 2008.

* cited by examiner

Add a new attribute to the Browser template

Attribute [                              ]

Is type [integer                    ] [Select...]

That
- ⦿ is an intrinsic properto or trait f this template
- ○ is a unique name or identifier of this template    Position key: [0]
- ○ refers to: [                    ] [Select...]

☐ must hve a value for every instance or fact of this template
☐ has a fixed set of possible values (ie. is normal)

Data Type
[Implementation...] [                    ]

Get Method: [                    ] [Select...]
Set Method: [                    ] [Select...]

Default value
☐ Attribute has default
[0]

[OK]
[Cancel]

FIG. 12

SYSTEM FOR ENTERPRISE KNOWLEDGE MANAGEMENT AND AUTOMATION

CROSS-REFERENCE TO RELATED APPLICATION

This application is a continuation of Provisional Patent Application Ser. No. 60/206,742, now abandoned; Provisional Patent Application Ser. No. 60/241,380, now abandoned; and Provisional Patent Application Ser. No. 60/627,741.

STATEMENT REGARDING FEDERALLY SPONSORED RESEARCH

Not applicable.

REFERENCE TO MICROFICHE APPENDIX

Not applicable.

BACKGROUND OF THE INVENTION

1. Field of the Invention

The present invention relates to a system for knowledge management and automation. More particularly, the invention relates to a system for knowledge management using natural language sentences, and even more particularly to a computer software system for knowledge management using natural language sentences that state the facts and imperatives that define how an entity behaves or operates and what the entity needs to know in order to so behave or operate.

2. Description of the Prior Art

Natural Language Systems. Natural language interfaces to SQL databases have existed for some time. The ability to query a data model using natural language is particularly beneficial to non-technical business personnel who manage operations that produce and/or are affected by the data so queried. Consumers also benefit from the ability to query data models concerning retail products and services, financial data, and other tabular or personal information. The prior art emphasizes the acquisition of a vocabulary of nouns and verbs and how they map to entities and relations in a relational data model. Research efforts and commercial products of the prior art have attempted a variety of approaches to augmenting data models with lexical and syntactic information in an effort to support natural language queries. The prior art does not disclose the translation of knowledge expressed in natural language into operational logic within programs. Moreover, the systems of the prior art are strictly syntactic with very little ability to understand the semantics of natural language. That is, the prior art treats natural language syntactically, not grammatically.

The limits of the prior art in natural language interfaces are demonstrated in products such as Linguistic Technology's English Wizard and Microsoft's English Query. These products have the distinct disadvantage that they do not address the issue of managing knowledge about an underlying object or data model. That is, the systems of the prior art demonstrate only a vocabulary that refers to parts of a model. The systems of the prior art have the distinct disadvantage that they do not have the ability to represent knowledge about a model (e.g., sentences constructed from such vocabularies) or to define knowledge prior to the implementation of a model.

The systems of the prior art have the additional disadvantage that they aim only to provide end users with access to data rather than to manage the definition of a model throughout its life cycle within and across an enterprise. Consequently, if the vocabularies and mappings of these systems are shared, untrained users may incorrectly define or alter mappings from the vocabulary into the model. Any such change, whether or not correct and appropriate, becomes permanent and destructive, without substantial support for version control, user privileges or object permissions.

The systems of the prior art have the additional disadvantage that they parse input from users according to syntactic rules and limited vocabularies. Because users cannot reasonably be fully aware of the restrictions imposed on their grammar by such rules, they are often frustrated when their input is rejected as non-grammatical. In addition, because the syntactic rules and word senses of the vocabulary are typically ambiguous, users are often frustrated when their grammatical input is misinterpreted.

Knowledge Management Systems. The practice of knowledge management involves capturing the information that business personnel need to know and use in the course of doing business. Existing knowledge management systems maintain such information as unstructured text and are primarily concerned with storing and providing access to documents comprised of at least paragraphs, but most typically many pages of content per document. Conventional knowledge management systems are almost never applied to managing documents comprised of at most one sentence.

The sentences within a knowledge management system include statements of fact as well as conditional imperatives. Collectively, such statements of fact and descriptions of behavior define the knowledge that people or computers must know and use in order to perform or support a business function or process. That is, the text stored in the database of a knowledge management system (i.e., a "knowledge base") documents the policies and practices of a business. Such a knowledge base is often administered and shared among the employees may be repeatedly referenced by personnel and can be used by business analysts to produce systems requirements and functional specifications which are subsequently implemented by programmers.

Conventional knowledge management systems have the significant disadvantage that they make no effort to formally acquire, analyze, and understand the lexical, syntactic, and grammatical structure of sentences within the text they manage. Consequently, these knowledge management systems are incapable of reliably translating such sentences between natural languages or into computer software expressed in any programming language. The limits of the prior art in knowledge management are demonstrated in products from Verity, Fulcruin, and Documentum. These products have the distinct disadvantage that they do not parse, acquire, or validate a document at the level of sentences. Consequently, the prior art is incapable ensuring that each sentence within the knowledge base is semantically consistent and unambiguous. Therefore, the knowledge documented in the prior art is suitable only for use by people, not for direct translation into computer programs. Moreover, without a semantically consistent and unambiguous understanding of every sentence in a knowledge base, automatic translation between natural languages (e.g., English or Spanish to or from French or German) is unreliable. Consequently, knowledge managed using the prior art requires manual translation in order to be effective within multilingual (e.g., multinational) organizations.

Software Design Methodology. An application of knowledge management involves the collection of business policies and practices, sometimes referred to as requirements and/or specifications for software that is to be developed in support of, for example, business operations. Established software design methodologies have the distinct disadvantage that they distinguish between the requirements and specifications of the business and the software implementation of such requirements and specifications. Systems of the prior art, such as the knowledge management systems listed above and software modeling tools that support software design methodologies (e.g., UML, Universal Modeling Language), such as Rational Software's Rose and Microsoft's Visio, are distinct. Knowledge management systems manage documents and software-modeling tools are distinct. That is, the prior art provides no automatic integration between the business requirements and specifications managed within a knowledge management system and the implementation details managed within a software design tool. Most specifically, the statements made by (i.e., the sentences authored by) the business are not isomorphic to the statements made within most programming language. Consequently, a mapping from business requirements and specifications to source code or vice versa cannot be maintained.

Knowledge management systems of the prior art have no capability to generate software, as discussed above. In addition, software design tools of the prior art have limited software generation capabilities in that they do not incorporate the business policies that are to be reflected within the generated software. Such design tools are limited to generating models into which programmers manually implement code reflecting separately documented business policies. In addition, programmers must manually modify and maintain generated source code when business requirements or specifications change. This manual intervention and implementation results in inordinate delays and poor reliability. Consequently, established software design methodologies suffer from the disadvantages that they emphasize comprehensive yet detailed design before and long cycle times between each version of the resulting software.

Business Process Automation. The natural language query systems of the prior art attempt to perform actions on the state of a database as it exists when the query is specified. Business processes, on the other hand, are defined by policies or practices that are applied whenever they are relevant. Such business polices and practices are typically known as business rules. Established software development methodologies involve the gathering of business rules from operational, managerial, and executive business personnel by so-called business systems analysts. These analysts are the authors of the requirements and specifications documents discussed above. Programmers use the resulting documents to craft software that reflects the business rules documented by the analysts.

To the extent that the work product of programmers is distinct from the work product of analysts, business process automation in the systems of the prior art has the disadvantage of communications overhead and its attendant costs and risks of confusion or ambiguity. This disadvantage also applies to the extent that the work product of the analysts is distinct from the statements or perspective of the operational, managerial, or executive business personnel from whom analysts gather business rules.

Software Development Process. As described above concerning software design methodology, the statements of traditional (i.e., procedural, including object-oriented) programming languages have the distinct disadvantage that they are not isomorphic to the requirements or specifications stated by operational, managerial, or executive business personnel. As discussed above, this disadvantage in design also manifests itself during the development process in that changes in the requirements or specifications cannot be incre-mentally reflected in source code. That is, changing or introducing a business policy or practice may affect or introduce many programming statements.

The difficulty of producing and maintaining programming statements that remain consistent with business statements concerning policies and practices can be avoided if the business statements are expressed and implemented as business rules. Expressing business policies and practices as independent statements in a rule-based language can maintain the isomorphism between business statements and programming statements. However, in order for the isomorphism to remain between business and programming statements, the business statements must be specified carefully enough that they become directly executable or so that the code which implements those business statements can be automatically generated and, thereafter, executed. In either case, the prior art continues to suffer from the distinct disadvantage that business personnel cannot directly specify statements with the formality required by rule-based programming languages and their engines or code generators.

Production Rule Systems. As described above, in order for business personnel to state business policy, practice, or process specifications such that they remain isomorphic with their implementation expressed as programming statements, it is necessary that those business statements are formally encoded in an unambiguous grammar which is either directly executable or from which executable programming statements can be automatically generated. In addition, the expression of such business statements must not be with regard to any sequence or procedure. That is, business personnel specify how business operates not by being programmers themselves but by dictating how a business is to handle or respond to situations whenever and as they arise. Such specifications may be regulations affecting or policies that state business processes, for example. Each such statement is a rule. If such statements are independent then the collection of such rules is known within artificial intelligence as a production system where each such rule is more precisely a production.

The prior art implements business rules as production rules using either a rule engine or triggers. Triggers may be implemented within object-oriented programming languages such as C++ or Java or using SQL or scripting languages provided by databases such as IBM's DBS, Oracle, or Microsoft's SQL Server. The disadvantage of the prior art concerning triggers is that the resulting implementation is less efficient and scalable that using a rule engine. In addition, the programming code necessary to codify the checking and application of rules and their triggers must be specified by programmers rather than being automatically derived from business requirements and specifications expressed as sentences within a knowledge management system.

The Rete Algorithm. The Rete Algorithm is recognized as the most efficient algorithm for the implementation of the aforementioned production systems. One alternative, the Treat Algorithm, offers competitive performance in limited cases. However, Rete's performance becomes increasingly dominant as the number of rules increases. One of the significant advantages of the Rete Algorithm is that it is the only published algorithm that checks the conditions of a set of rules within an expected period of time that is asymptotically independent of the number of rules. Thus, only the Rete Algorithm scales to thousands of rules. The principal reference for the Rete Algorithm is "Rete: A Fast Algorithm for the Many Pattern/Many Object Pattern Match Problem", Artificial Intelligence, 19, pp 17-37, 1982, hereby incorporated by reference.

The prior art does not relate the rules implemented using the Rete Algorithm (nor rules implemented as triggers, as discussed above) to the sentences managed within a knowledge management system. Moreover, the Rete Algorithm has no intrinsic support for organizing the application of rules within a decision making process nor for coping with logical inconsistencies between statements authored by one or more users of a knowledge management system. Consequently, the prior art is incapable of supporting the resolution of inconsistencies or inadequacies in the collective sentences of a knowledge management system or of auditing the applicability of individual sentences in a knowledge management system. Thus, the prior art does not facilitate the testing, monitoring, or improvement of the knowledge managed.

Source Code/Version Control. The software requirements and specifications documents for software systems that are typically produced by business systems analysts can be subject to version control within a knowledge management system in much the same way that the resulting source code may be managed using a source code version control system. Computer files of any type, including documents as in a knowledge management system, but most typically files of software source code expressed in computer programming languages are commonly managed by version control systems. Products such as Merant's PVCS or Microsoft's Source Safe are typical of the prior art. The prior art typically manages versions of content at the level of document files (including source code files). However, the granularity of version control in the prior art is too coarse for a knowledge management system that manages a vocabulary and sentences expressed using that vocabulary. Consequently, the prior art is unable to manage knowledge that is accumulated incrementally by acquiring and maintaining dictionary definitions of words and sentences that use previously acquired vocabulary with subsequently modifiable dictionary definitions.

The set of statements in a knowledge management system that documents business processes evolves over time. Such statements are formulated and come into effect incrementally and may evolve through multiple versions before expiring. Statements are formulated by an author and may be refined in subsequent versions by various authors who are permitted to affect such statements or who have the privileges need to grant themselves such permissions. The prior art has no effective ability to manage versions of statements at such a level of granularity, particularly where certain words in the vocabulary used within such statements may be restricted to certain authors or groups of authors and where words in the vocabulary are related to implementation details maintained as software model information within the knowledge management system where such software model information is itself subject to version control.

Because adding, removing, or changing a statement usually has some actual impact on a business, the ability to modify the repository of statements affecting business should be administered. Because business people have various responsibilities and capabilities, operations on the repository of statements should be controlled by the administration of privileges, which may be assigned to users or groups of users. Because individual statements may have varying degrees of maturity or certification, operations on statements should be controlled by administration of permissions that may be granted to users or groups of users for a statement or a set of related statements. However, all the forgoing is beyond the current state of the art in knowledge management and source code control systems.

Speech Recognition. Speech recognition systems recognize either continuous speech where words are expressed naturally without intervening pauses or as isolated words. Isolated word recognition is awkward other than for very limited purposes and is becoming less relevant as the quality of continuous speech recognition systems increases. The prior art in continuous speech recognition provides accurate recognition by balancing restrictions on grammar with restrictions on vocabulary, one of which must be fairly constraining in order for speech recognition performance to be acceptable. Grammars in the prior art are either probabilistic word sequence models or context free syntactic specifications. Probabilistic word sequence models do not ensure syntactically correct recognition, however, and neither approach can ensure that what is recognized is semantically clear and unambiguous. Consequently, the prior art is incapable of the natural language processing required in order to capture grammatically correct and unambiguous knowledge.

SUMMARY OF THE INVENTION

The present invention is directed to a system for managing business knowledge expressed as statements, preferably sentences using a vocabulary, where such statements may be automated by the generation of programming language source code or computer program instructions. As such, the present invention also manages software design specifications that define, describe, or constrain the programming code it generates or programs with which it or the code it generates is to integrate.

All information managed within the present invention may be maintained within a relational database that is encapsulated within an object-oriented model. Each object in this model is subject to version control and administration using permissions. Each user of the system is an object and belongs to one or more groups. Users and groups may be granted privileges. Objects may be created, examined, used, modified, deleted, or otherwise operated upon only if corresponding permission or privilege has been granted.

The vocabulary managed by the present invention consists of the function words commonly used in a language, such as the auxiliary verbs, prepositions, articles, conjunctions, and other essentially closed parts of speech in English, as well as open parts of speech, such as nouns, verbs, adjectives, and adverbs.

The software design managed by the present invention subsumes procedural, object-oriented or relational software design models such as those that may be expressed in Universal Modeling Language (UML) or Object Role Modeling (ORM), including procedural interfaces including actions that may have side effects as well as applicative functions and predicates. Software design information may be acquired through graphical user interfaces provided by the present invention or as may be imported by the present invention from external sources such as eXtensible Markup Language (XML) Document Type Definition (DTD) or schema files, UML files or repositories, or through introspection or reflection capabilities supported for Java, Component Object Model (COM), Common Object Broker Request Architecture (CORBA), SQL databases, and other sources. The use of these system allows the present invention to represent the business or other information as at least one statement comprising at least one relationship, where the relationship instantiates a relation having at least one role and an indefinite concept filling the role. This is in sharp contrast to the systems of the prior art, which are only capable of utilizing definite concepts in this manner.

The present invention does not require a pre-existing software design nor does it require a complete software design that is to be generated or implemented in the future. Thus, the present invention allows for the specification of grammatical sentences without implementation detail. The nouns within these statements may be defined as external data which may be further described as a type of data or piece or aggregation of data, such as a relational database column or table or an attribute or class of an object, respectively. The verbs within statements may be defined externally either declaratively, as in a database relation, or procedurally, as in a method or member function of an object-oriented class. However, nothing in the present invention requires external implementation details to exist for nouns or verbs before they may be used in sentences. In this manner, the present invention distinguishes between the semantics of nouns and the verbs that relate them in sentences from the implementation details that may subsequently be defined or modified.

The present invention also facilitates the creation of composite sentences. In one embodiment, the present invention also interprets a composite sentence, whether persistently or transiently, as a logical formula in first order predicate calculus or similar logic formalism supporting conjunction, disjunction, and negation as well as existentially and universally quantified variables. The invention further interprets natural language, including singular common count noun phrases and connectives, as variables in formal logic. Further, the invention then implements the logical interpretations as rules. The sentences managed by the present invention are represented by their semantic content rather than their syntactic specification or resulting implementation. Consequently, the knowledge expressed within sentences is managed without ongoing need or reference to—hence independently of—lexical, syntactic, or implementation details. The syntax of their specification can be presented, however, as can alternative expressions within their source or alternative natural languages, such between English, French, German, or Spanish, for example.

The sentences managed by the present invention may be acquired programmatically using its object model, by loading sentences from a file of text or XML, or through an interactive user interface which supports menu, keyboard, and voice input. In any case, the present invention ensures that any acquired sentence uses only defined vocabulary, is syntactically valid, and can be represented semantically without ambiguity.

The user interface provided by the present invention facilitates productive use without prior training or familiarity with the limited English vocabulary and syntax supported using continuous or word-by-word authoring with the keyboard, mouse, or voice. At any point the user interface presents a visual image of what words or types of data (e.g., numbers) may come next. At any point the user is free to use keyboard input, mouse clicks or drag operations, or voice input. Whenever a valid sentence has been specified it can be completed and prior words can be erased or undone at any time.

The present invention allows multiple users to view, edit, and contribute knowledge simultaneously. In addition, the present invention includes administrative facilities to designate users (or groups of users) who are to have permission to perform operations on various types of objects as well as which users have privileges to perform certain operations without regard to permissions. Furthermore, the present invention keeps track of version information for all permitted operations, including author, annotation, and time stamp tracking.

The present invention has the capability to present or generate reports or programming code or instructions for the versions of statements, vocabulary, and software design information as they existed at any specified point in time. As a result, the present invention can report activities or changes over time and reconstruct or reproduce reports or regenerate programming code from any time. The present invention can also undo recent changes or forget prior changes when convenient.

The present invention can organize statements within a taxonomy of modules and bring those statements to bear under procedural control. In addition, statements may be excluded or overridden under certain conditions. The present invention can generate production rules that implement the statements organized within a taxonomy of modules with such exclusions and overrides and subject to procedural control in a manner that can be audited.

The present invention can test the impact of sentences by generating production rules and applying those rules to test cases using audit facilities and reporting the statements that are or are not applicable to a case. In addition, the present invention can identify statements that become applicable or that are no longer applicable to a test case as the versions of a statement or of all statements within a taxonomy of modules change.

The present invention can automatically import and interactively acquire external implementation or design details and map between the vocabulary used in statements and the external implementation or design such that the present invention can generate programming code that integrates with external systems such as relational databases or object-oriented programs.

BRIEF DESCRIPTION OF THE DRAWINGS

FIGS. 8(a)-(b) are computer screen shots for specifying a declarative relation in accordance with the system of the present invention.

FIG. 12 is a computer screen shot illustrating the use of templates in accordance with the system of the present invention.

DETAILED DESCRIPTION OF THE PREFERRED EMBODIMENT

Figure 1:
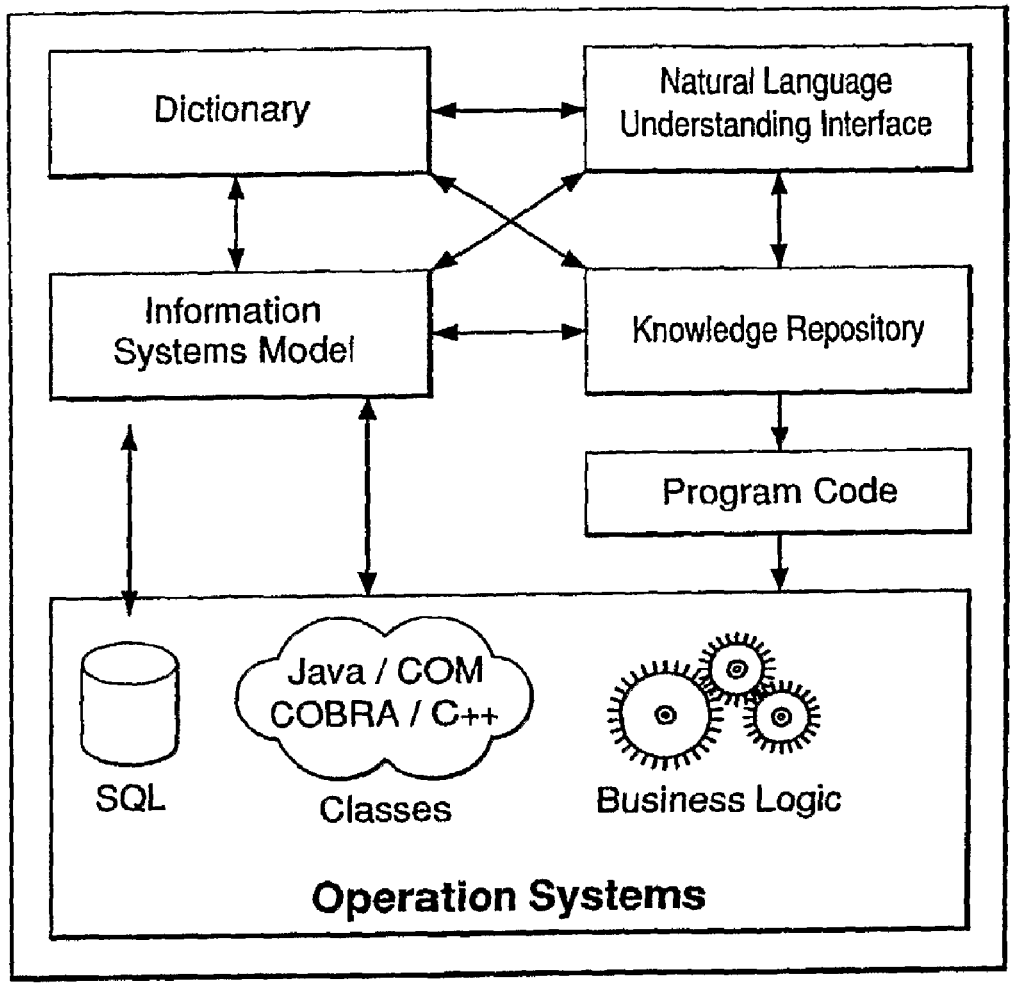
FIG. 1 is a diagram of the preferred embodiment of the components of a computer software system in accordance with the present invention.

It will be appreciated that the following description is intended to refer to the specific embodiments of the invention selected for illustration in the drawings and is not intended to define or limit the invention, other than in the appended claims.

The present invention advances the state of the art individually and collectively among the areas of natural language interfaces, knowledge management, software design methodology, business process automation, software development process, production rule systems, relational database systems, object-oriented programming, spoken language interaction, and automatic translation.

The present invention is directed to a knowledge management system that allows non-technical business personnel to express knowledge that is to be managed and possibly automated using natural language sentences.

An illustration of a preferred embodiment of the present invention, as embodied in a computer software application, is shown in FIG. 1. As shown in FIG. 1, the knowledge management and automation system of the present invention may include a natural language understanding interface, which allows users to author, review, and edit sentences that are stored in knowledge repository using the natural language vocabulary of dictionary, which is also stored in the knowledge repository and which may refer to an information systems model that specifies design information about various operational systems, all in accordance with the system of the present invention as described herein. Given an information systems model for targeted operational systems, the present invention can generate program code that operates with or within the various operational systems in order to implement the sentences (whether interactive questions, immediate imperative commands, or conditional business rules) specified using the natural language understanding interface.

Sentences are acquired through the natural language interface using the vocabulary maintained in the dictionary that may be mapped to an information systems model mapped from an SQL database or Java object model (or other sources), all of which are maintained in a knowledge repository from which the present invention can generate procedural and/or rule-based code that executes as business logic that integrates with external object models and/or databases.

Figure 2:
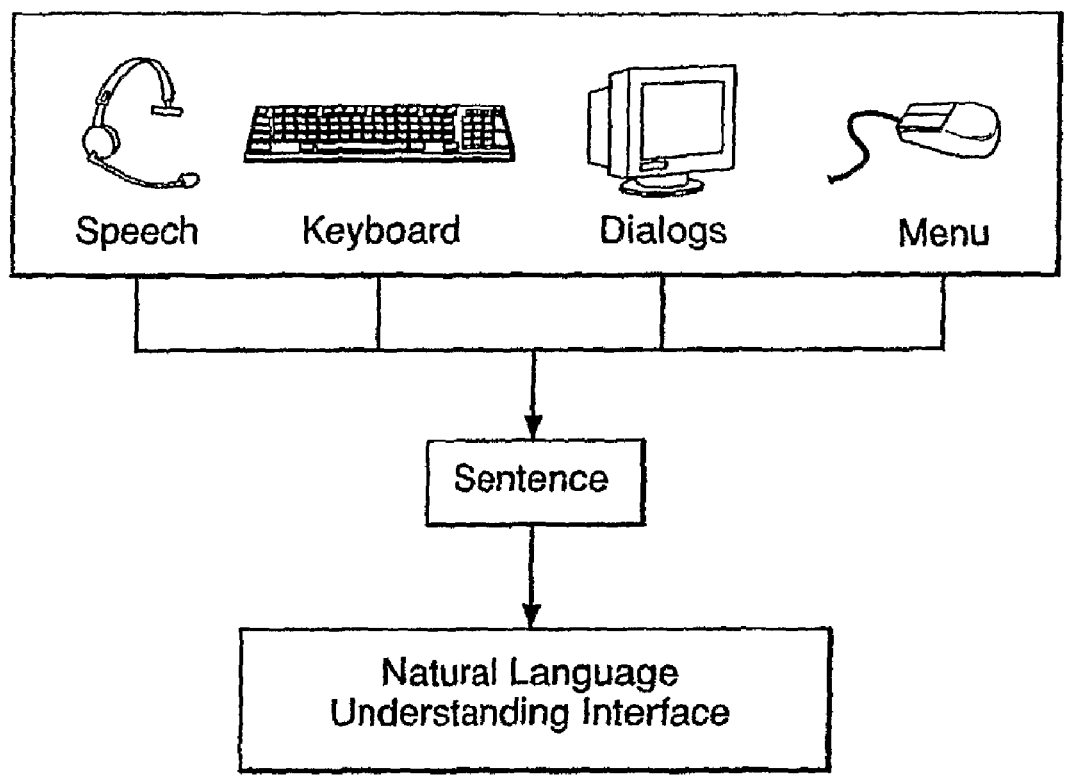
FIG. 2 is a diagram illustrating the natural language understanding interface of the present invention.

The natural language understanding interface preferably includes a graphical user interface (GUI), but is not limited thereto and could also be strictly textual or spoken language in nature, each and all of which are provided in the present invention, all of which together constitute a preferred embodiment, as show in FIG. 2.

With regard to interaction, the knowledge acquisition system of the present invention preferably guides untrained users in making grammatically correct and unambiguous sentences by various methods and using various interfaces, such as by displaying all grammatically correct words that may come next within a list of words, or within a list of menu options; or by display grammatically correct noun words that may come next within an taxonomy.

The knowledge acquisition system of the present invention may also preferably guide untrained users by displaying grammatically correct words that may come next using waterfall and/or cascading menus in a manner that avoids computing all grammatically correct sentences (i.e., a computationally expensive or intractable problem), or that prunes words that may come next but given which no grammatically complete sentence exists (especially in real-time without requiring the pre-computation of all grammatically correct sentences beforehand).

It may also guide users by displaying user interface controls that facilitate the entry of numbers, dates, strings, etc.; or by presenting a button, period, or other display to indicate that the words expressed thus far constitute a grammatically correct sentence; or by integrating with speech recognition systems so as to accept syntactically correct input but to limit recognized speech to grammatically correct sentences as might be input using the dialog, controls, and menus described above; or by integrating with speech recognition systems so as to accept words presented by the dialog and menus described above; or by integrating with speech recognition systems so as to accept input to the number, date, time, and string controls described above.

Figure 3:
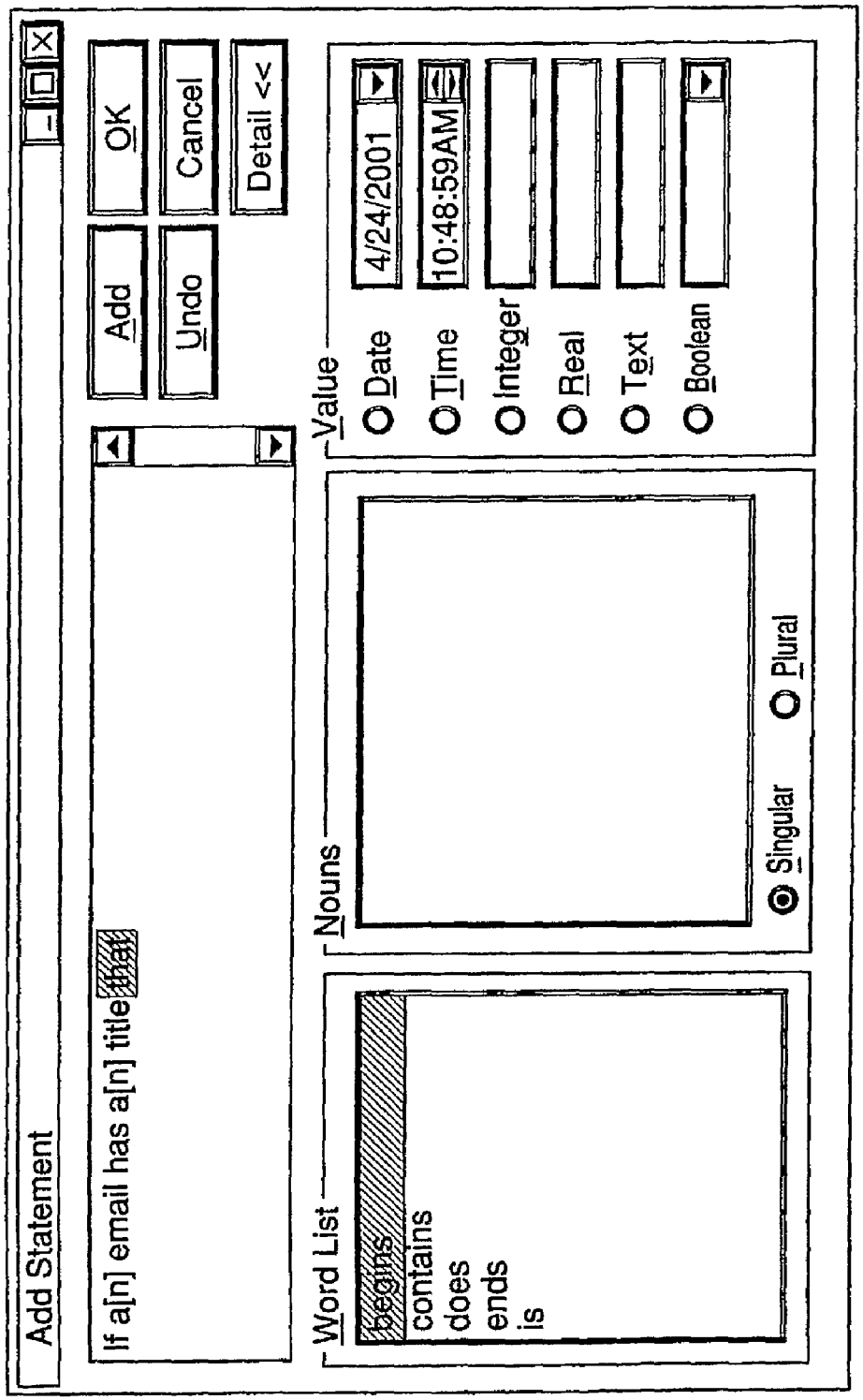
FIG. 3 is a computer screen shot of a preferred embodiment of a dialog box for adding a statement in accordance with the present invention.

The preferred embodiment of the present invention allows a user to switch freely between any mode of input, such as typing, pointing and clicking, dragging, or speaking in the course of authoring or editing a sentence. Moreover, the preferred embodiment can provide guidance to the user by displaying or suggesting words that could occur next by predicting possible inputs, including inputs that could complete a word being typed in using a keyboard. An example of such and input is shown in FIG. 3.

Figure 4:
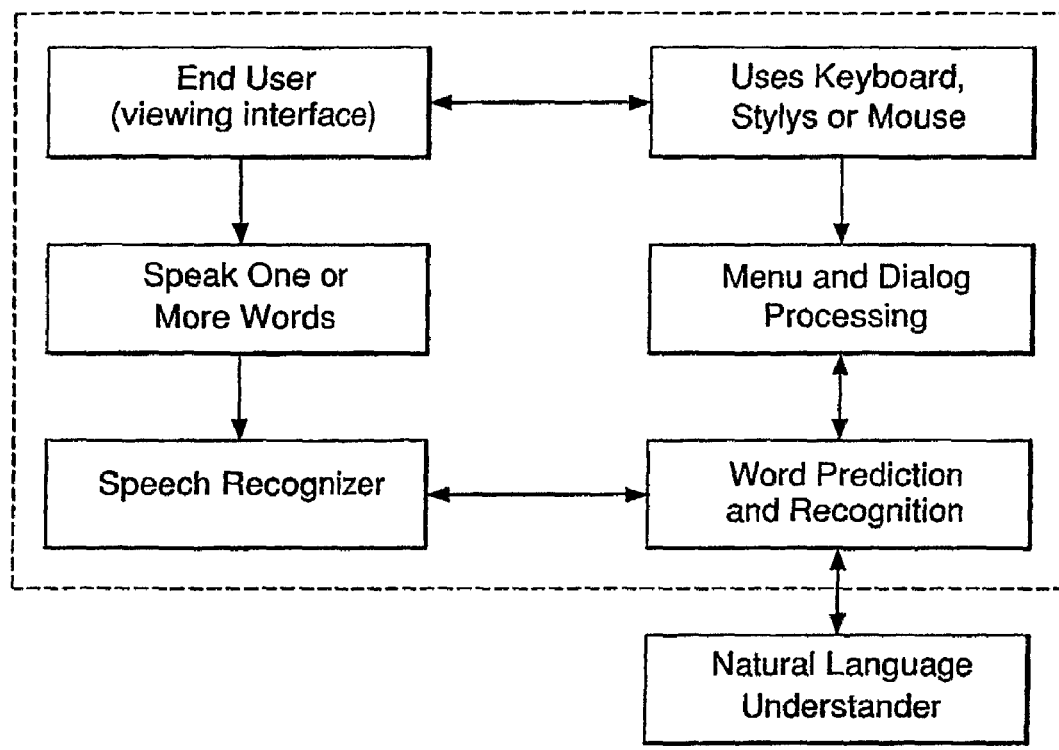
FIG. 4 is a diagram illustrating the manner of inputting information in accordance with the system of the present invention.

The system of the present invention provides the preceding dialog by which it allows input by keyboard, mouse, or speech input at any time in accordance with diagram shown in FIG. 4. Note that the dialog shown in FIG. 3 also allows for input to be erased or "undone" and that input cannot be accepted unless it constitutes a grammatical sentence (i.e., the "OK" button is disabled otherwise.)

Figure 5:
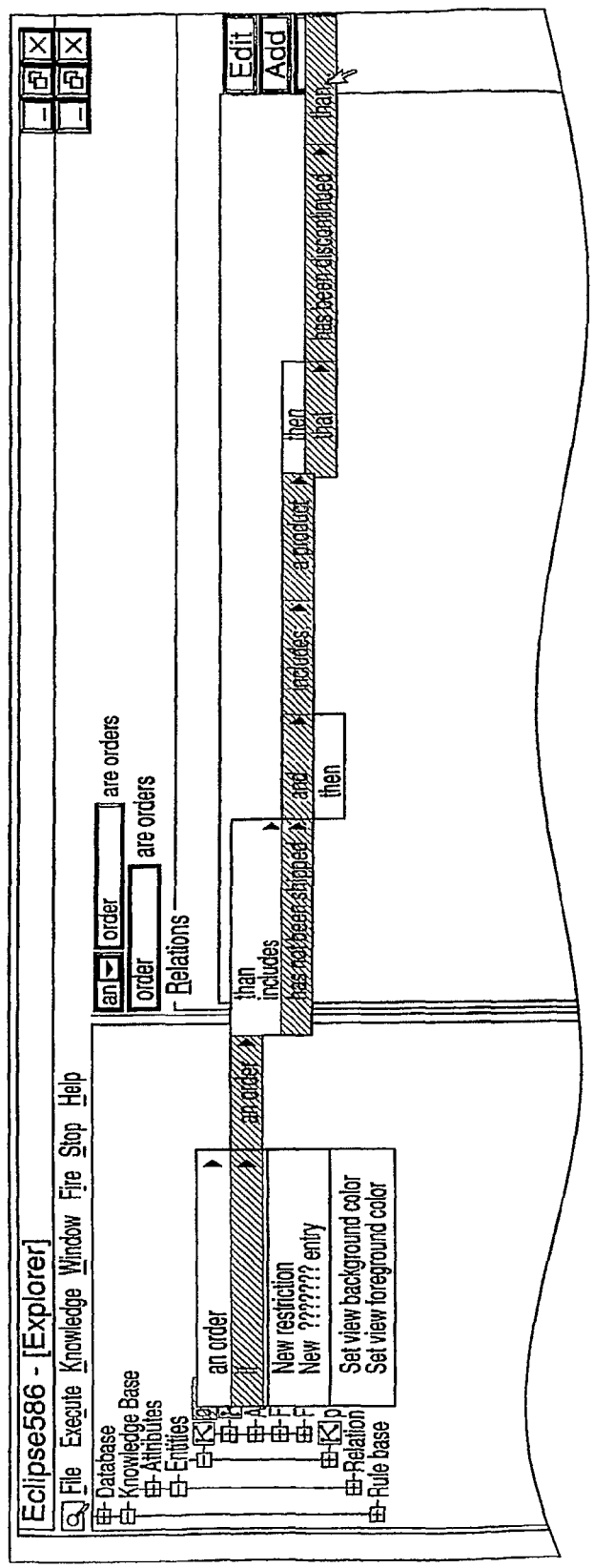
FIG. 5 is a computer screen shot of a preferred embodiment of the cascading menus of the system of the present invention.

The preferred embodiment also allows a user to quickly examine alternative multi-word continuations of a sentence and to author a sentence by simply dragging a pointer, as illustrated in FIG. 5, which shows a cascading menu that may be navigated forward and backward by clicking or simply dragging the pointer. This technique has the significant advantage over the prior art that it more productively assists and guides users to syntactically correct and complete as well as semantically clear unambiguous sentences without prior training in or experience with the grammar and vocabulary available to the user (e.g., English with words grounded in a particular data model.)

The preferred embodiment also allows a user to use continuous speech recognition capabilities and the resulting recognition improvements that a closed vocabulary and restricted grammar yield given the current state of the art in speech. It is preferred to have fairly unrestricted grammar with a potentially large vocabulary. However, the current art in speech recognition performs poorly given an unrestricted grammar and a large vocabulary.

The current art in speech recognition has limited ability to constrain grammar. Commercial speech recognition engines such as IBM's Via Voice and Dragon's Dictate and others that implement Microsoft's Speech Applications Programming Interface (SAPI), for example, accept only a context free grammar specification. The context free grammar specification of the prior art cannot reflect the semantic constraints understood by the present invention, however. An example of the grammar that may be used in the present invention is shown below in context free form:

```
<action> ::== <intransitiveImperative>
<action> ::== <subjectPhrase> <objectPhrase>
<action> ::== <verbTerminal> <complements>
<action> ::== <verbTerminal> <nounPhrase>
<action> ::== <verbTerminal> <nounPhrase> <complements>
<action> ::== <verbTerminal> <nounPhrase> <nounPhrase>
<action> ::== <verbTerminal> <nounPhrase> <nounPhrase> <complements>
<action> ::== <verbTerminal> <nounPhrase> <prepositionalPhrase>
<action> ::== <verbTerminal> <nounPhrase> <prepositionalPhrase> <complements>
<actions> ::== <action>
<actions> ::== <action> and <actions>
<binaryFunction> ::==
<complements> ::== <prepositionalPhrase>
<complements> ::== <prepositionalPhrase> <prepositionalPhrase>
<complements> ::== <prepositionalPhrase> <prepositionalPhrase>
    <prepositionalPhrase>
<complements> ::== <prepositionalPhrase> <prepositionalPhrase>
    <prepositionalPhrase> <prepositionalPhrase>
<complements> ::== <prepositionalPhrase> <prepositionalPhrase>
    <prepositionalPhrase> and <prepositionalPhrase>
<complements> ::== <prepositionalPhrase> <prepositionalPhrase> and
    <prepositionalPhrase>
<complements> ::== <prepositionalPhrase> <prepositionalPhrase> and
    <prepositionalPhrase> <prepositionalPhrase>
<complements> ::== <prepositionalPhrase> and <prepositionalPhrase>
<complements> ::== <prepositionalPhrase> and <prepositionalPhrase>
    <prepositionalPhrase>
<complements> ::== <prepositionalPhrase> and <prepositionalPhrase>
    <prepositionalPhrase> <prepositionalPhrase>
<complements> ::== <prepositionalPhrase> and <prepositionalPhrase>
    <prepositionalPhrase> and <prepositionalPhrase>
<copularStatement> ::== <nounPhrase> <predicate>
<declarative> ::== <copularStatement>
<declarative> ::== <subjectPhrase> <objectPhrase>
<declaratives> ::== <declarative>
<declaratives> ::== <declarative> and <declarative>
<determiner> ::== <indefiniteDeterminer>
<determiner> ::== the
<directObjectPhrase> ::== <nounPhrase>
<indefiniteDeterminer> ::==
<nonTerminalConcept> ::== <adjective> <nonTerminalConcept>
<nonTerminalConcept> ::== <concept>
<nonTerminalConcept> ::== <ordinal> <nonTerminalConcept>
<nonTerminalConceptPhrase> ::== <determiner> <nonTerminalConcept>
<nonTerminalConceptPhrase> ::== <determiner> <nonTerminalConcept>
    <preposition> <nonTerminalConceptPhrase>
<nonTerminalConceptPhrase>
    ::== <determiner> <nonTerminalConcept> <verbPhrase> <preposition>
    <nonTerminalConceptPhrase>
<nonTerminalConceptPhrase> ::== <indefiniteDeterminer> <nonTerminalConcept>
<nonTerminalConceptPhrase> ::== <nonTerminalConcept>
<nonTerminalConceptPhrase> ::== <nonTerminalConceptPhrase> <thatClause>
<nonTerminalConceptPhrase> ::== <nonTerminalInstance>
<nonTerminalConceptPhrase> ::== <nonTerminalInstance> <preposition>
    <nonTerminalConceptPhrase>
<nonTerminalConceptPhrase> ::== <quantifier> <nonTerminalConcept>
<nonTerminalConceptPhrase> ::== another <nonTerminalConcept>
<nonTerminalConceptPhrase> ::== the <definiteReference>
<nonTerminalConceptPhrase> ::== the <nonTerminalConcept> <thatClause>
<nonTerminalConceptPhrase> ::== the <ordinal> <nonTerminalConcept>
<nonTerminalConceptPhrase> ::== the <result> <preposition>
    <nonTerminalConceptPhrase>
<nonTerminalInstance> ::== <instance>
<nonTerminalInstance> ::== a(n) <instance>
<nonTerminalInstance> ::== the <instance>
<nounPhrase> ::== <nonTerminalConceptPhrase>
<nounPhrase> ::== <nonTerminalInstance>
<nounPhrase> ::== <nounPhrase> * <nounPhrase>
<nounPhrase> ::== <nounPhrase> + <nounPhrase>
<nounPhrase> ::== <nounPhrase> − <nounPhrase>
<nounPhrase> ::== <nounPhrase> / <nounPhrase>
<nounPhrase> ::== <nounPhrase> <binaryFunction> <nounPhrase>
<nounPhrase> ::== <number> * <nounPhrase>
<nounPhrase> ::== <percentage> of <nounPhrase>
<nounPhrase> ::== <value>
<nounPhrase> ::== the number of <nonTerminalConceptPhrase>
<nounPhrase> ::== the product that equals <nounPhrase> * <nounPhrase>
<nounPhrase> ::== the quoutient that equals <nounPhrase> / <nounPhrase>
<nounPhrase> ::== the total <nonTerminalConcept> <preposition>
    <nonTerminalConceptPhrase>
```

```
<objectPhrase> ::== <verbPhrase>
<objectPhrase> ::== <verbPhrase> <adjective>
<objectPhrase> ::== <verbPhrase> <adjective> <complements>
<objectPhrase> ::== <verbPhrase> <complements>
<objectPhrase> ::== <verbPhrase> <directObjectPhrase>
<objectPhrase> ::== <verbPhrase> <directObjectPhrase> <complements>
<objectPhrase> ::== <verbPhrase> <directObjectPhrase> <prepositionalPhrase>
<objectPhrase> ::== <verbPhrase> <directObjectPhrase> <prepositionalPhrase>
    <complements>
<objectPhrase> ::== <verbPhrase> <nounPhrase> <directObjectPhrase>
<objectPhrase> ::== <verbPhrase> <nounPhrase> <directObjectPhrase> <complements>
<ordinal> ::==
<predicate> ::==<objectPhrase>
<predicate> ::== is <adjective>
<predicate> ::== is <nounPhrase>
<predicate> ::== is <preposition> <nounPhrase>
<prepositionalPhrase> ::== <preposition> <nonTerminalConceptPhrase>
<prepositionalPhrase> ::== <preposition> <nounPhrase>
<prepositionalPhrase> ::== <preposition> the <roleName> that is <nounPhrase>
<quantifier> ::== any
<quantifier> ::== every
<quantifier> ::== no
<rule> ::== <actions> if <declaratives>
<rule> ::== if <declaratives> then <actions>
<rule> ::== if <declaratives> then <copularStatement>
<statement> ::== <actions>
<statement> ::== <copularStatement>
<statement> ::== <declarative>
<statement> ::== <rule>
<subjectPhrase> ::== <nounPhrase>
<terminal> ::==
<thatClause> ::== <thatClause> and <thatClause>
<thatClause> ::== that <objectPhrase>
<thatClause> ::== that <predicate>
<value> ::==
<value> ::== <identificationText> <terminal>
<value> ::== <terminal>
<value> ::== <terminal> <identificationText>
<verb> ::== <terminalVerb>
<verbPhrase> ::== <adverb> <verb>
<verbPhrase> ::== <auxiliary> <adverb> <verb>
<verbPhrase> ::== <auxiliary> <verb>
<verbPhrase> ::== <auxiliary> not <adverb> <verb>
<verbPhrase> ::== <auxiliary> not <verb>
<verbPhrase> ::== <modal> <adverb> <verb>
<verbPhrase> ::== <modal> <auxiliary> <adverb> <verb>
<verbPhrase> ::== <modal> <auxiliary> <verb>
<verbPhrase> ::== <modal> <auxiliary> not <adverb> <verb>
<verbPhrase> ::== <modal> <auxiliary> not <verb>
<verbPhrase> ::== <modal> <verb>
<verbPhrase> ::== <modal> not <adverb> <verb>
<verbPhrase> ::== <modal> not <verb>
<verbPhrase> ::== <verb>
<verbPhrase> ::== do/does not <adverb> <verb>
<verbPhrase> ::== do/does not <verb>
<verbPhrase> ::== each and every
<verbPhrase> ::== is not
<verbPhrase> ::== none
```

The preceding grammar is context free in that it does not specify agreement between subject, verb and object phrases, for example. Nor does it specify that singular forms of verbs must be used with singular subjects, that neuter pronouns must be used to refer to neuter subjects or objects, et cetera. Consider, for example, the case that when a customer places an order, it makes no sense for a speech recognizer to allow the verb "places" after an order; however, a context free specification of English grammar could not provide this guidance to the speech recognizer. Consequently, the preferred embodiment determines the grammar to be used by a speech recognizer not simply based upon the context free grammar of a natural language and the limited vocabulary it manages, but based on the syntactic and semantic relationships that it also manages about that vocabulary. Most significantly, the preferred grammar reflects semantic constraints upon syntactic sentences based upon the types of nouns (and their adjectives) that can play certain grammatical roles using various conjugations of verbs (and their adverbs). In the example above, a customer was the subject of the verb "place" expressed in active voice.

In most cases, the grammar produced by the preferred embodiment will not reflect all the semantic constraints of a vocabulary since the number of grammatical rules necessary can grow exponentially. For example, even the syntax of subject-verb-direct object can be quadratic in the number of verbs if the direct object phrase includes an embedded verb phrase.

To the extent that less than all of the semantic constraints are reflected in the grammar provided the speech recognizer, the speech recognizer will have an increased tendency to recognize words, phrases, or sentences that do not form permissible sentences. Consequently, the preferred embodiment of the invention accepts whatever the speech recognizer provides, whether a word, phrase, or sentence, and validates it word by word as if input by a keyboard, terminating when it cannot determine a plausible and permissible extension of the sentence under construction. When integrated within the interface described above, any poorly recognized word can be undone or reversed and statements can be continued using a mouse, keyboard, or speech.

In order to allow a user to speak a fraction of a sentence or a word, but still enjoy the higher recognition rate afforded by continuous speech recognition systems given constraining grammars and many words to recognize, the preferred embodiment will augment its generated grammar with the individual words and phrases, such as verbs following a subject noun phrase, noun phrases for object phrases following a verb, preposition phrases following verbs or object phrases they may complement, and function words such as determiners, pronouns, and others that may occur next grammatically. In this manner, the preferred embodiment allows a user to complete a fully grammatical sentence word-by-word or phrase-by-phrase without being fully constrained by a speech recognizer's demand for dictation of a completely grammatical sentence in a single utterance.

The preferred embodiment will maintain a vocabulary in a manner substantially equivalent to that of electronic dictionaries (including thesauri), albeit with enhanced support for morphological, etymological, phonological, and grammatical information. The preferred embodiment will support an extensible thesaurus where a dictionary definition may be categorized using set of type theoretical relations (e.g., "member", "subset", "disjoint"); to provide an initial set of thesauri categories and relationships between them, such as in Roget's Thesaurus, Princeton's WordNet, and other word classification systems. The dictionary entries may also include detailed parts of speech and semantic information, including but not limited to: singular, plural, collective, or mass forms, gender (e.g., masculine, feminine, neuter.) The dictionary entries may have affiliated information, which may vary by part of speech, such as abbreviations, acronyms, synonyms, antonyms, homonyms, compound words, stems for irregular conjugations or inflections, mood (e.g., for modal auxiliary verbs), case (e.g., for verbs and pronouns in English and determiners in German), gender (e.g., for nouns in German), person (i.e., for pronouns), number (e.g., singular, plural, mass, collective, partitive), gradability including comparative or superlatives forms (i.e., for adjectives), et cetera.

The dictionary of the present invention may include English or other language dictionary entries, which include definitions for parts of speech, such as nouns, verbs, adjectives, etc. The system of the present invention preferably includes an initial vocabulary and syntax for each natural language supported where such initial vocabularies include the function words of a language and any additional words that may be useful in general or in specific application areas. The dictionary of the present invention preferably provides an initial set of dictionary entries for the auxiliary verbs, pronouns, prepositions, articles, connectives, and other particles within English. The system preferably allows permitted users, including users that possess appropriate privileges, to extend such initial vocabularies.

The system of the present invention preferably includes support for an extensible set of copular, intransitive, transitive, and other verb definitions in which the grammatical roles (e.g., indirect object) of the verb definition are identified and whether each such grammatical role is required in every usage of said verb definition, and where the concepts (i.e., noun phrases) that may fill each such grammatical role may be categorized within the thesaurus (e.g., the subject of "owns" is a member of the set of legal entities), and where a grammatical role may have associated preceding or following dictionary definitions (e.g., such as a definition of the preposition "to" preceding the indirect object of the English infinitive "to give"), and where a grammatical role may be identified with a semantic role (e.g., "agent" or "recipient") where such semantic role may be specified by categorization within the thesaurus, for example.

The system of the present invention preferably also has the ability to support an extensible grammar for phrases and sentences in one or more natural languages where the grammar supports agreement between grammatical roles (e.g., "subject") and verbs concerning number, gender, tense; case, the types of nouns expected for various semantic and syntactic roles of verbs, complements, relative clauses, et cetera.

The system of the present invention preferably uses a production rule system to implement and support its extensible grammar in a manner that allows incremental extensions as independent grammar rules that do not need to be positioned among existing grammar rules or merged into procedures that implement existing grammar rules as is the case for any approach other than a production system in which the order of rules is irrelevant. Thus, the system of the present invention is more easily extended than systems of the prior art.

The system of the present invention preferably generates multiple goals recursively through its grammar where such goals correspond to words or non-terminals that can be predicted and optionally presented by a natural language understanding interface. In addition, the system of the present invention preferably uses data-driven processing to recognize input from a natural language understanding interface as satisfying one or more goals where such input may satisfy multiple goals if using speech and words sound similar or if a word has multiple dictionary definitions, such as being both a noun and a verb or having two senses as in hitting in baseball versus boxing.

This is distinct from natural language user interfaces of the prior art in that the present invention can compute its prediction before each input and respond as input occurs without re-computing its predictions after each input and checking the input against each prediction. Thus, the system of the present invention has the distinct advantage that it can provide guidance (i.e., show valid inputs and complete partial inputs as much as possible) before receiving completed input and respond rapidly as input is provided.

The system of the present invention preferably uses a production system based on the Rete Algorithm so that performance of the grammar processing does not degrade significantly as it is extended. The system also preferably uses a version of the Rete Algorithm that has been extended to support backward chaining where goals are automatically generated as in rule languages like Prolog but where goals are represented declaratively (i.e., as data) and non-redundantly such that the normal data-driven processing of the Rete Algorithm recognizes input as matching one or more goals. Thus, the system of the present invention provides real-time interaction with users, graphical interfaces, and speech recognition systems on personal computers where systems of the prior art are typically less than real time.

In sharp contrast to the prior art, the system of the present invention preferably uses production rules that combine syntactic and the semantic constraints. The systems of the prior art separate syntactic processing and semantic processing into different phases of processing. Syntactic specifications in the prior art typically amount to several hundred context free rules plus additional ad hoc code to enforce semantic constraints after receiving syntactic input. The present invention improves upon the prior art by eliminating the combinatorial effort of parsing or generating parses that are syntactically valid but semantically invalid, this being particularly significant for longer sentences and any sentences that use multiple verbs, relative clauses, prepositions, or conjunctions or other connectives, such sentences being quite commonly managed as knowledge. In addition, the present invention improves upon the prior art in that its predictions are semantically valid. The prior art is limited to syntactic plausibility to the extent that its semantic checking presumes a completed input if not a completed syntactic structure as input.

It should be noted that the ability of the present invention to combine syntax and semantics within grammar rules implemented as production rules is preferably based on the Rete Algorithm extended to support goal generation and truth maintenance and the unification of entity/relationship, object role modeling, and procedures described herein. Specifically, the production rules of the present invention rely upon the roles defined in relations in addition to grammatical information of the dictionary entries in order to constrain their processing by all forms of agreement.

The dictionary maintained by the preferred embodiment includes semantic information in addition to the information described above such that the relationships between words are also represented in a manner that enables sentences that are valid from a lexical and syntactic perspective to be identified as semantically invalid or ambiguous. The semantic capabilities of the present invention are beyond that of the prior art in that they are specified conceptually, without requiring prior implementation or being limited to the state of an implementation at a single point in time. That is, the semantic relationships between words defined in the dictionary are preferably not directly tied to implementation details or specifications. The present invention allows the semantic information about words and between words to be defined without any implementation detail. In addition, as implementation details change or become available, a preferred embodiment should allow previously defined words to be related to their initial or refined implementation details.

The semantic information maintained in the dictionary of the preferred embodiment of the present invention should not be limited to modeling data using entity/relationship (ER) or object/role modeling (ORM) as in the prior art, but should preferably extend such modeling capabilities in a unified manner to accommodate modeling of procedural interfaces including arbitrary procedures and methods of member functions of traditional and object-oriented programming languages, for example.

Figure 6:
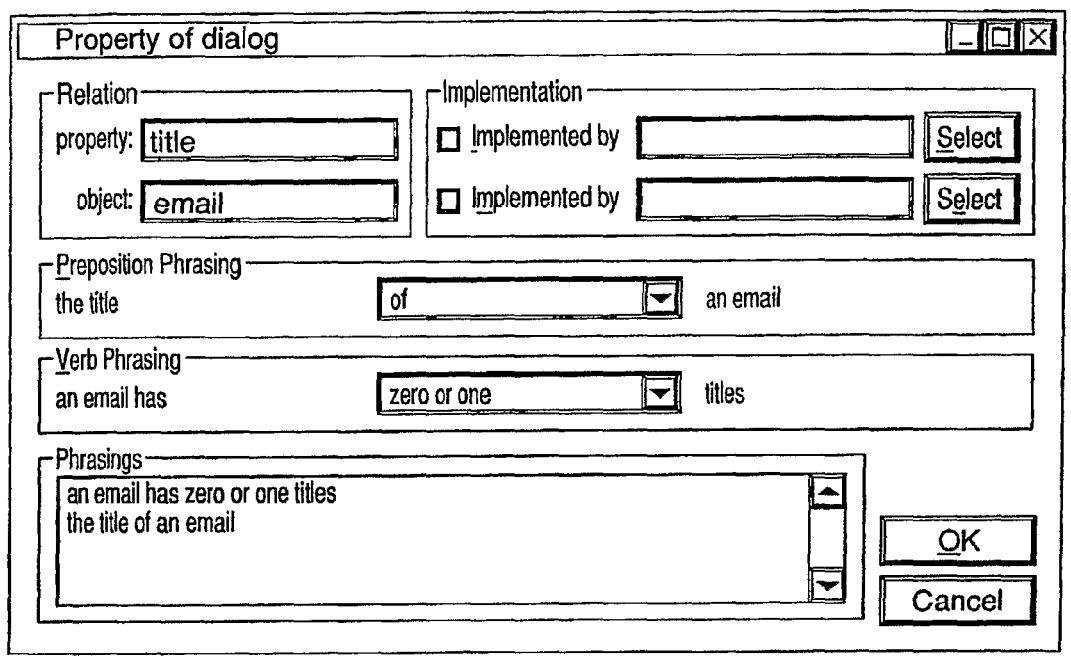
FIG. 6 is a computer screen shot of a dialog box for the implementation of relationships between nouns in accordance with the system of the present invention.

The dictionary of the preferred embodiment of the present invention supports semantic relationships between to nouns without any implementation detail. This is illustrated by the dialog box shown in FIG. 6. The implementation of this relation could be within or between database tables, in an XML file format, by a method returning an as yet undefined data type or collection in Java, et cetera.

Figure 7:
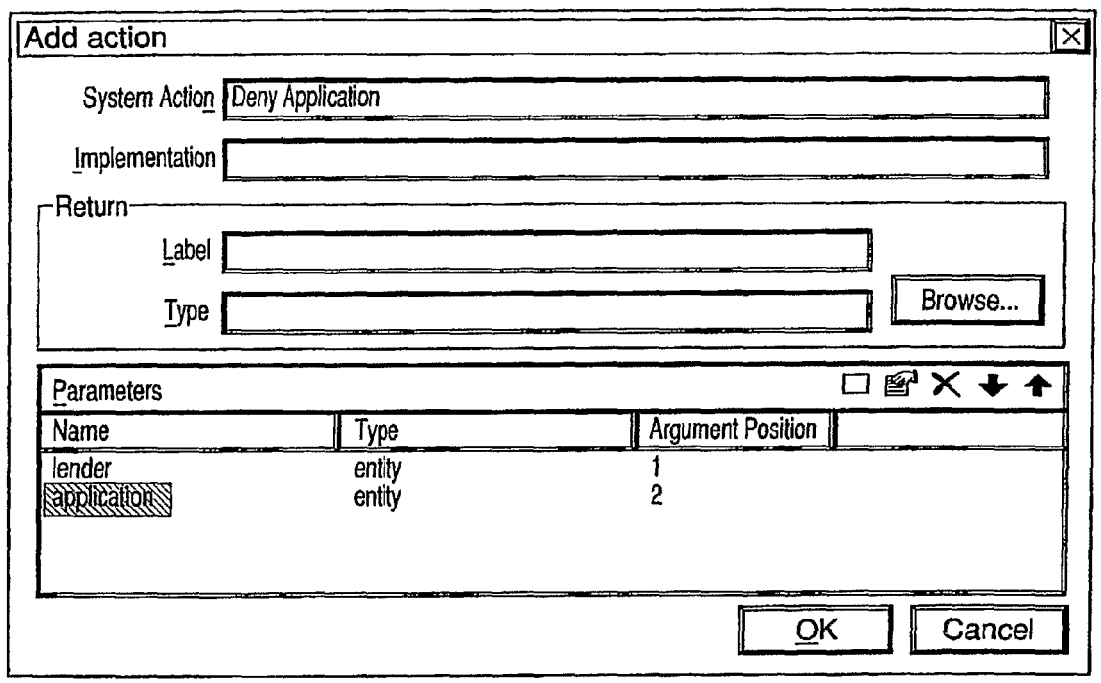
FIG. 7 is a computer screen shot of a dialog box for defining an action in accordance with the system of the present invention.

The dictionary of the present invention preferably supports verbs that do not correspond to relationship between entities in a relational database or objects of different types or classes. For example, the dialog shown in FIG. 7 illustrates the definition of an action rather than a declarative relationship. As shown in FIG. 7, the definition of a action may be, for example, "a lender denies an application". Such an action may not be stored as data but may simply correspond to the transient invocation of a procedure. Thus, modeling within the present invention goes beyond the declarative relational basis of entity relationship or object role modeling.

Figure 8A:
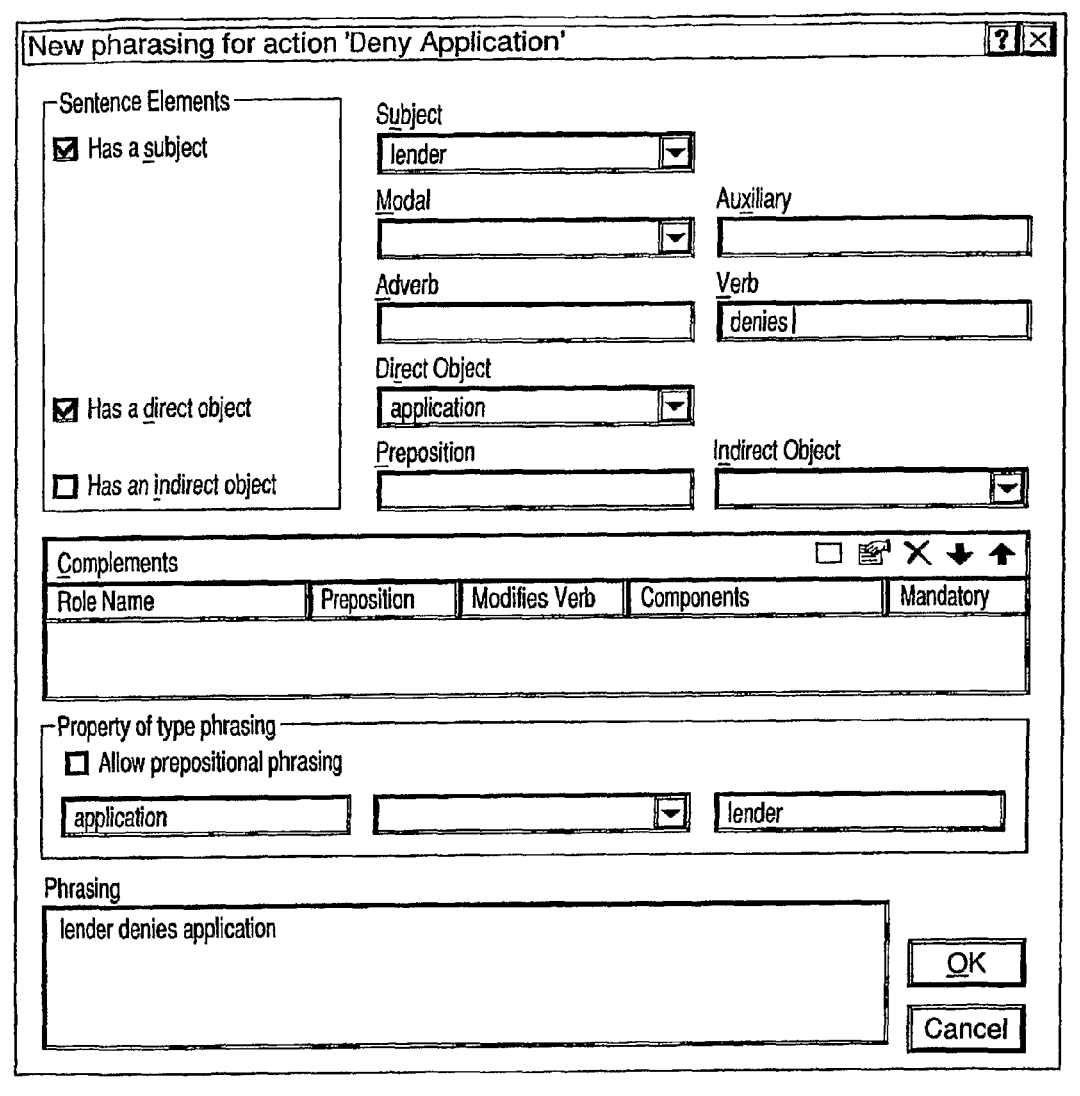
Figure 8B:
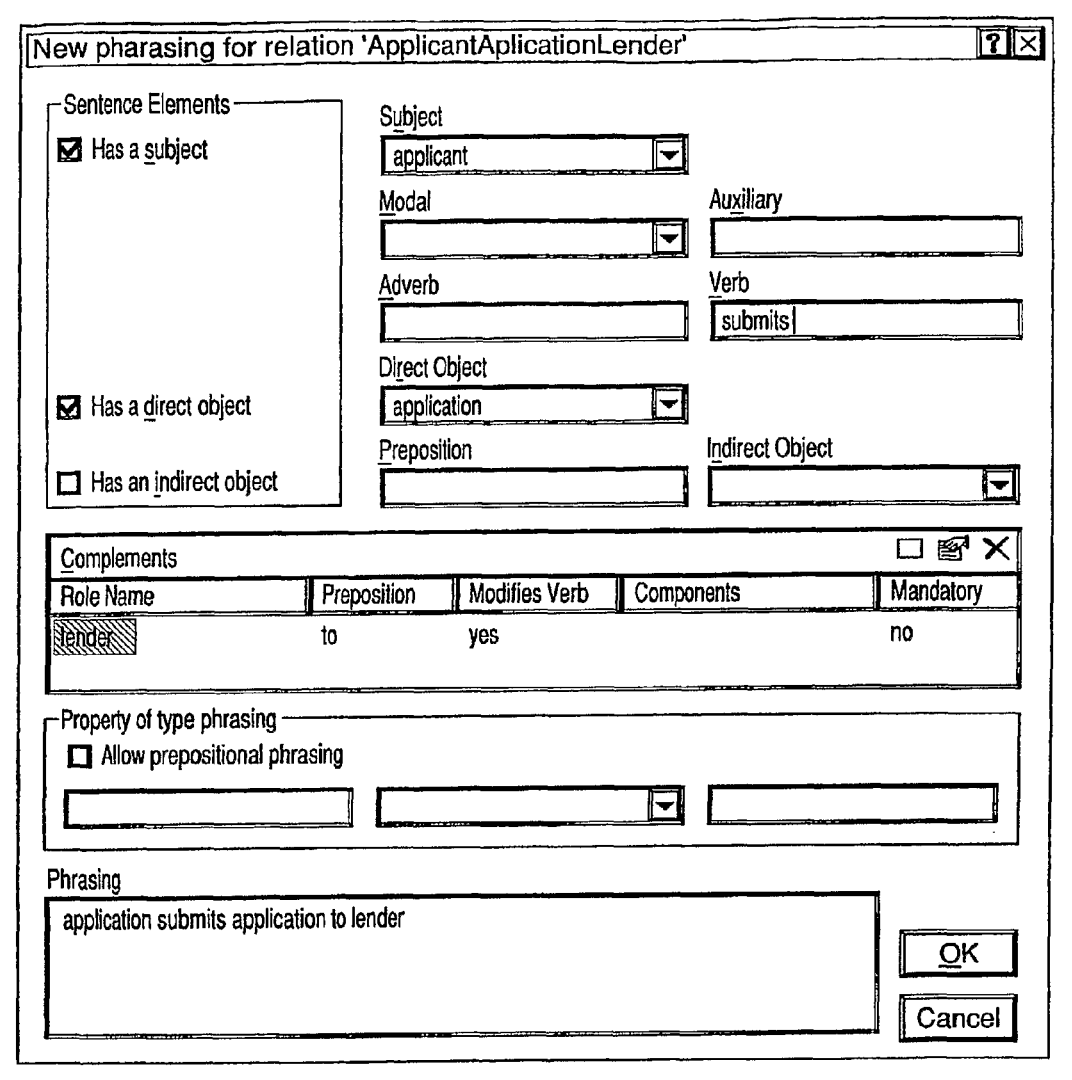

In the present invention, the phrasing of an action or other procedure is specified no differently than a phrasing of a declarative relation. For example, FIGS. 8(a) and (b) show a dialog box illustrating a declarative relation. This dialog can be used for any relation, declarative or procedural, modeled in the present invention. Thus, the implementation details are not required in order to author sentences and may be changed from declarative to procedural without affecting the use of dictionary words within sentences. In addition, the implementation details of a role may change without affecting the dictionary or statements that use words or phrasing that refer to the changed role.

Figure 9:
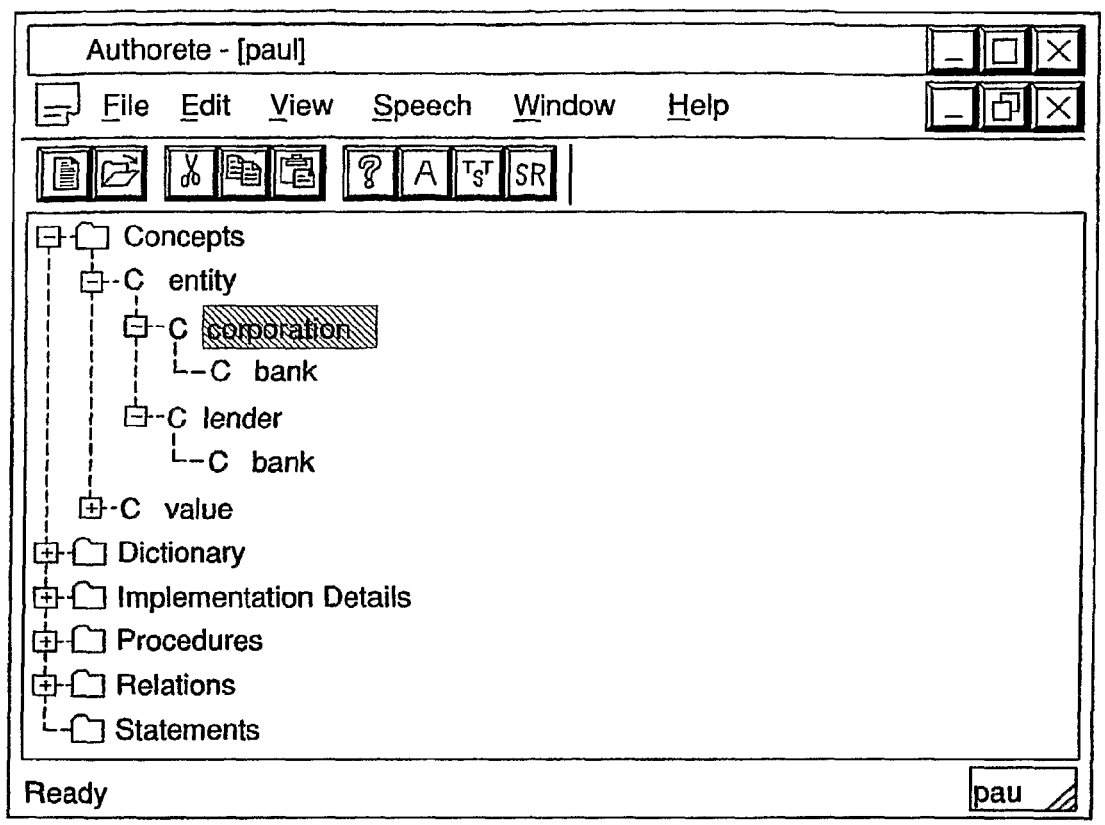
FIG. 9 is a computer screen shot illustrating the ontology of the system of the present invention.

The preferred embodiment of the present invention allows for nouns defined in the dictionary to be organized taxonomically. A specialized noun dictionary entry may inherit certain attributes (e.g., gender, whether or not the noun functions linguistically as an inanimate object and/or as a person), and may fill the roles its parent nouns may play in relations (whether procedural, declarative, or unimplemented) and their phrasings (e.g., as subject, object, or complement of certain verbs). This taxonomy may be presented graphically as an a-cyclic graph or as an outline using a "tree" control, where more general concepts represented by nodes that have specializations (e.g., company generalizes corporation, partnership, etc.); where specific instances of a concept are grouped under the node for that concept (e.g., proper nouns under their concept, such as "Fido" under "dog") (e.g., adjectives under their attributive concept: "male" under "gender"); where concepts organized within an initial ontology, such as distinguishing types from attributes, from concepts, from actions, etc. This is illustrated in FIG. 9.

The preferred embodiment of the present invention allows for specialized nouns to be defined by classification of their parents where such classifications may be identified by combinations of necessary and sufficient conditions expressed as one or more sentences that may be authored, managed, and automated as supported for other knowledge. For example, the distinction between a specialized noun dictionary entry from each of its parent noun dictionary entries (of which there may be zero, one, or more) may also be stated in a sentence using a verb which has a dictionary definition referring to a relation in which the parent noun plays a role. In addition, the natural language user interface of the present invention understands that nouns may be organized taxonomically and allows more specialized nouns to play roles defined as require one of their generalizations.

The preferred embodiment of the present invention provides an extensible ontology of disjoint and root count nouns for "values" and "entities" and further concepts that inherit from "values" for each data type that may fill a column of a database row, a field or a record, or a member datum of an object. This preferably includes entities inheriting directly from "values" for dates & times, strings, Boolean values; and "numbers" including integer and real numbers, percentages, fractions, and numbers of items or amounts of units.

The preferred embodiment of the present invention provides an extensible ontology of units which measure amounts of mass noun quantities such as time, distance, mass, and currency, each of which is a primitive dimension that may be measured on one or more scales where each scale has one or more unit, such as English or metric scales of distance, mass, and time or as in currencies and their various bills and coinage. This ontology is extensible in that additional primitive dimensions can be specified and that new units can be defined by combining primitive exponential dimensions, as in miles per hour being distance divided by time (i.e., $distance^1 * time^{-1} * mass^0 * currency^0$).

The preferred embodiment of the present invention provides a extensible set of arithmetic capabilities and grammar that includes binary arithmetic predicates and functions and phrasings along with deductive implementations that understand that units must agree for addition, subtraction, and comparisons and how to combine units for multiplication, division, et cetera. The agreement and combination of units is understood such that inconsistent statements can be recognized and may be avoided.

All of the forgoing considerations of grammar, inheritance, agreement, are supported in the present invention. Consequently, the present invention has a significant advantage over the prior art.

The knowledge management system of the present invention preferably stores sentences not as parse trees with reference to vocabulary but as relationships and roles of those relationships. The preferred embodiment of the present invention thus separates the semantics of a sentence from the lexicon and syntax used to specify that semantics. Thus, the knowledge management system of the present invention has the distinct advantage over the prior art in that knowledge managed is independent of vocabulary and grammar and even independent of language. Moreover, the knowledge acquisition system of the present invention may allow equivalent meanings through a variety of expression (i.e., different sentences.)

The preferred embodiment of the present invention might render such meanings using any lexicon that is grounded in the relations and roles used in the relationships and roles of those relationships by which the knowledge management system represents the original sentence (provided that the knowledge management system has a grammar for the natural language of the lexicon). The preferred embodiment of the present invention might also have the advantage that it could render a sentence in potentially several different manners in order to effectively communicate, disambiguate, or clarify its interpretation of a sentence. Consequently, a preferred embodiment of the present invention will also have the distinct advantage that it can acquire, translate, and present sentences across multiple natural languages.

Figure 10A:
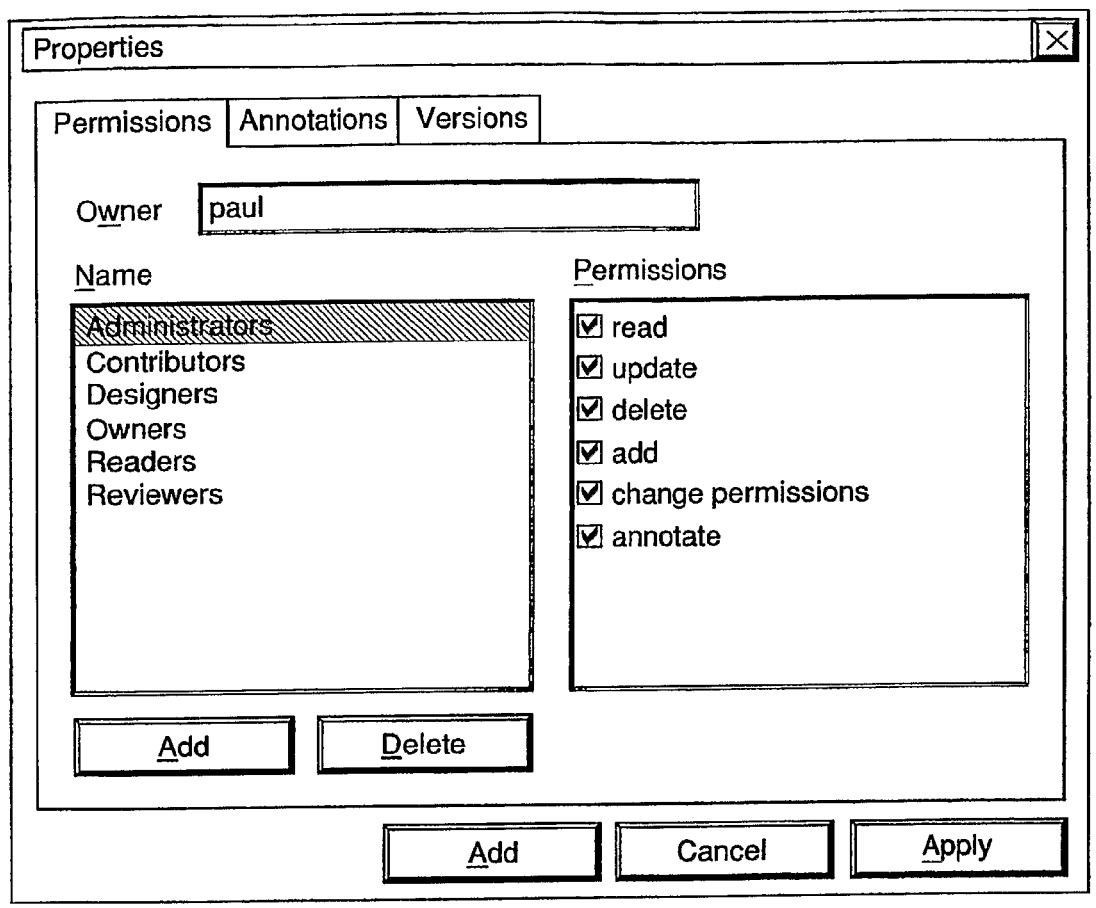
FIGS. 10(a)-(c) are computer screen shots illustrating version maintenance in the system of the present invention.
Figure 10B:
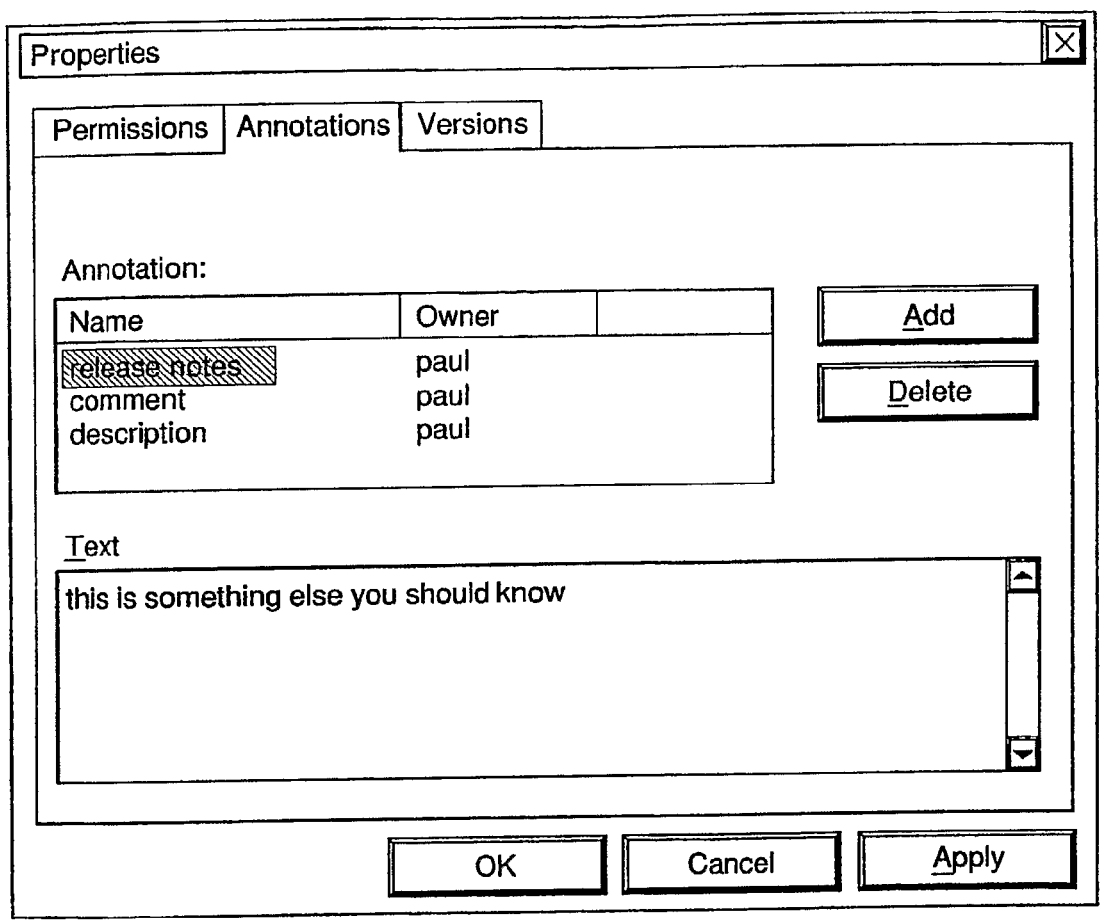
Figure 10C:
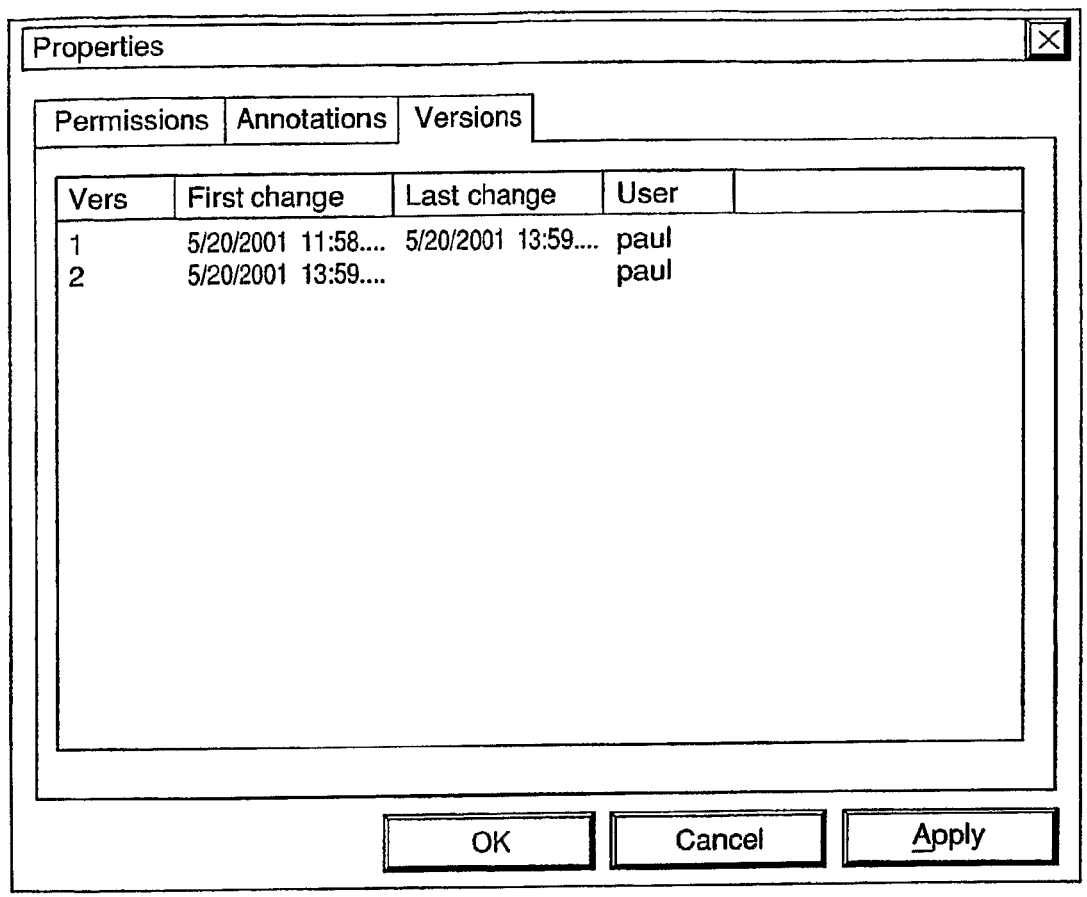

The present invention is also a preferred embodiment in that it provides complete version control for any dictionary entry, relation, phrasing, sentences, templates, attributes, or other objects. That is, the present invention retains the original author of the first version of any such object as well as the user who creates any subsequent versions. The present invention allows the original and each subsequent version to be annotated while it keeps track of author/editor and session information, including time and date: The system preferably does so using applicative methods, such that the original version of any such construct, the sequence of versions of any such construct, and the author or editor for every version of any such construct can be determined. This is illustrated in FIGS. 10(a)-(c).

The system preferably can be accessed or edited by multiple simultaneous users with optional administration of access and edit privileges in general or on a per object basis using permissions. The system preferably maintains referential integrity and prevents overlapping edits by multiple simultaneous authors including, for example, overlapping edits of relations and their roles or of templates and their attributes.

Figure 11:
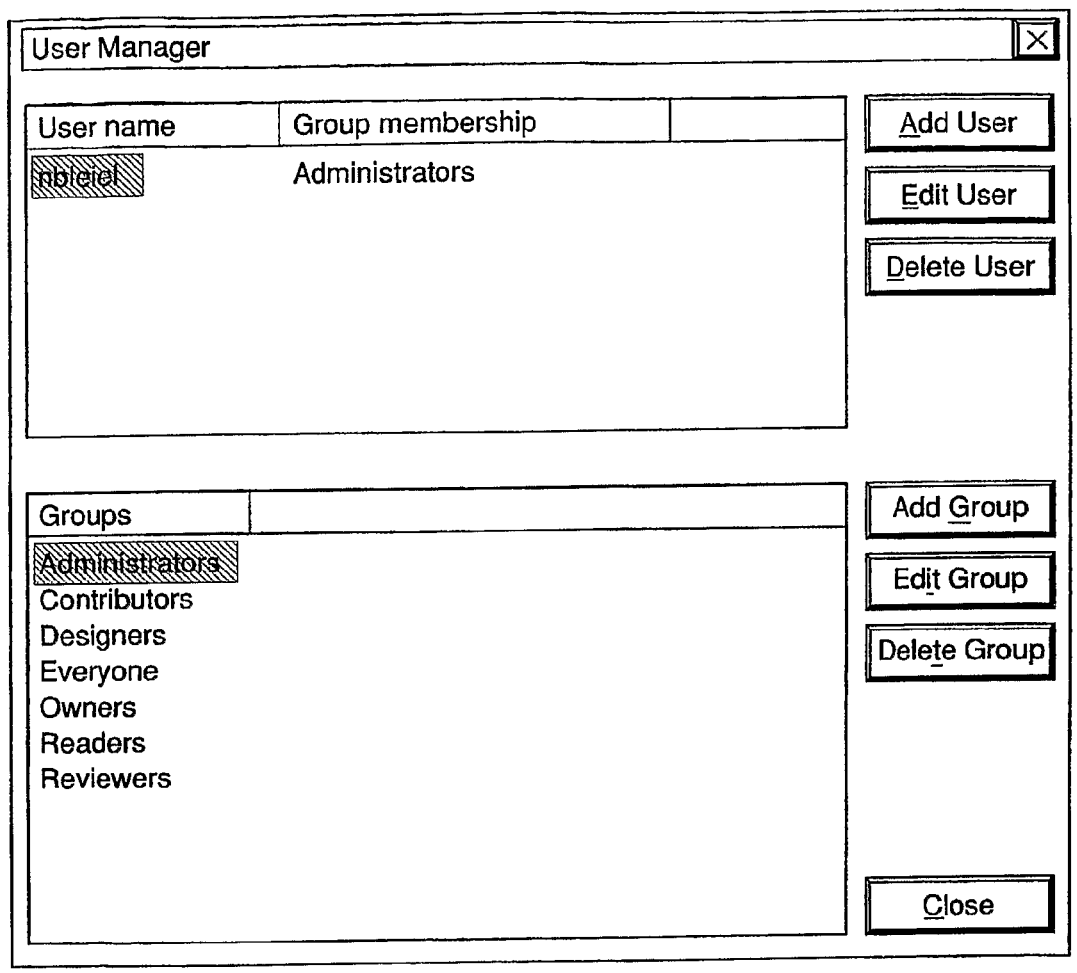
FIG. 11 is a computer screen shot illustrating the user manager of the system of the present invention.

As discussed above, the knowledge management system preferably includes a means of identifying users and administrating privileges and groups while also keeping track of the creators and owners of various objects (e.g., words, phrases, and sentences). In addition, the knowledge management system of the present invention maintains a complete history of all versions of the objects and data in the knowledge base as users modify, augment, and delete its contents. With these capabilities the system can prevent conflicting edits and allows users to operate on the knowledge contained therein at any point in time, with the ability to focus on or exclude versions created by some set of users since a prior point in time. Multiple simultaneous users may modify the knowledge base across an enterprise, allowing it to be shared enterprise-wide. This is illustrated in FIG. 11.

Because of these capabilities, the present invention has the significant advantage over the systems of the prior art that it can manage the specification of knowledge as a set of unambiguous and grammatical sentences using a managed vocabulary. Moreover, the present invention has the significant advantage that it can do so for multiple, simultaneously active users within an enterprise. In addition, the present invention can do so without implementation details and as implementation details change independently of knowledge expressed using implementation independent semantics.

Note that the management of sentences as knowledge by the present invention is in contrast to the prior art in which natural language interfaces are primarily concerned with processing a query or command at the moment it is stated rather than storing a sentence as business knowledge that is to be managed and, perhaps, automated.

The software modeling system of the present invention provides for a mapping between words used in the semantic modeling in which verbs relate nouns and external systems design or implementation details.

With regard to vocabulary, the software modeling system of the present invention preferably supports the entities that may correspond to tables within databases or classes within object models, including those aggregated within other tables or classes; or proper nouns that are specific instances of a conceptual entity and may identify specific rows or instances of tables or classes; or types of data that may be stored within databases or objects; or attributes that entities may possess and that may have a type and that may correspond to columns of database tables or attributes of classes; or values that may occur within cells of rows and columns of a table in a database or as possible values of attributes of objects.

The knowledge acquisition system also preferably supports the dictionary definition of one or more verbs that map to relations between concepts which may correspond to references between tables or classes (e.g. a order includes some products); or references between tables or classes and their aggregated objects (e.g. a person has an address); or relations between concepts and columns of database tables or attributes (e.g., a person was born on a birth date, a person has a gender); or actions that may be performed where an action may have optional or mandatory roles (e.g., an action may require a subject or a direct or indirect object); or an action may be performed by the system (e.g., if the action requires no subject) or an agent (e.g., if the action is a method of an agent class); or an action may correspond to a procedural language routine where roles of the action correspond to parameters that may be required by the routine; or functions, as a special case of actions, where the result returned from a routine also plays a role in the relation corresponding to the function; or Predicates, as a special case of functions, where the result returned from a function is interpreted as a Boolean value (i.e., true or false).

The software modeling system of present invention supports the creation, modification, and deletion of "templates" and "attributes" where templates may inherit from generalizations and be presented by a user interface and where a template may correspond to a relational database table, object, an XML entity, an object-oriented class, et cetera and an attribute may correspond to a column, attribute or subentity, or member datum or access method of each, respectively.

Nouns representing entities may be implemented by templates and, thereby, by relational database tables, XML entities, object-oriented classes, et cetera. Nouns representing values may be implemented by attributes where they play a role in a relation. The present invention may also ensure referential integrity between roles and attributes (e.g., different roles of declarative relations are implemented by different attributes), between templates and entities (e.g., an template cannot implement a concept that has a generalization that is implemented by a second template that is not a generalization of the first template.), and between templates and attributes (i.e., attributes cannot reference undefined templates and deleting a template also deletes all its attributes). This is illustrated in FIG. 12.

The preferred embodiment of the present invention enforces referential integrity between concepts and roles (i.e., roles cannot reference undefined concepts and concepts cannot be deleted while referencing roles exist) and roles and relations (i.e., roles cannot reference undefined relations and deleting a relation also deletes all its roles).

The present invention supports the interactive specification or automatic acquisition of external "data types" (i.e., other than those discussed above which are provided as built-in kinds of values, such as numbers) and "procedures", including object-oriented classes or interfaces and their member functions (e.g., as in Java, COM, CORBA, or C++).

The present invention may incorporate procedures in addition to data by distinguishing declarative relations from procedural relations, where the roles of declarative relations may correspond to attributes, as described above, and procedural relations are implemented by a named procedure. The named procedure may be resolved at compile, link, load, or run time from a designated library, may be actions performed on a class of objects or by a class of agents, or may be global or specific to a designated class of objects.

Figure 13:
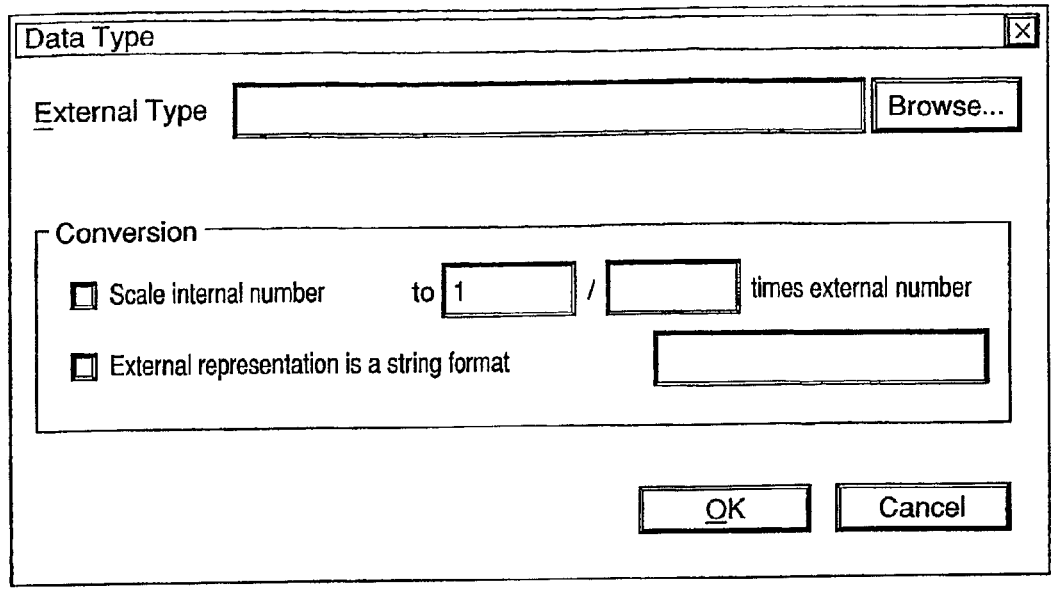
FIG. 13 is a computer screen shot the designation of roles of procedural relations in the system of the present invention.

The roles of procedural relations may correspond to parameters of a procedure, where a role has a data type that may be convert to or from a value by combinations of numeric scaling and string processing, one role may be designated as that of the "result" for a function, the "result" role of a predicate uses the built-in concept of a Boolean value, and the order of parameters is reflected in an ordering of roles. This is illustrated in FIG. 13.

The same scaling and formatting applied between roles and data types of external procedures may be applied between attributes and procedural access function (e.g., "get" methods), public member data, and database column types.

In sharp contrast to the prior art, the system of the present invention has the ability to describe computer programs using natural language, which is particularly beneficial to non-technical business personnel who manage businesses that utilize the programs so described. Such usage of natural language provides greater control over the implementation of computer programs to business people with lower implementation and maintenance costs. Thus, using a natural language system to specify knowledge that becomes active within decision support and other information systems provides distinct advantages.

Also in sharp contrast to the prior art, the system of the present invention is a knowledge management system that understands the precise word senses and grammatical structure of the sentences it maintains, with support for multiple users and version control including owner and editor tracking with administration of privileges and permissions that allows the documentation of business practices, policies, and regulations to be managed with the same rigor used to implement computer software; and for contributions to be made and content to be viewed in any of several natural languages.

The system of the present invention also preferably includes an initial grammar and vocabulary for one or more natural languages; allows people to define new words using on-screen forms or natural language statements; allows people to express knowledge as natural language declarative statements; allows people to express action using natural language imperative statements; parses statements into a language independent representation that relates their clausal and phrasal structure to specific language independent word senses; allows people to organize concrete or abstract, common or proper, singular or plural, and other nouns within subtype, subset, and membership taxonomies through on-screen interfaces or natural language statements; allows people to specify various active or passive, transitive or intransitive, and other usages of verbs and their grammatical and semantic roles; and allows natural language statements to be expressed using text or spoken language.

The knowledge acquisition system of the present invention specifically accommodates business knowledge, policies and practices preferably by providing for mappings between words and the content and structure of object-oriented or relational business models; or by acquiring mappings between words and business models by importing standard object-oriented and relational database systems; or by providing for mappings between words and programming interfaces, such as predicates, functions, procedures, or object-oriented methods; or by acquiring mappings between words and business processes by importing standard application programming interface (API) definitions, including standard object-oriented interface definition languages (IDL), and other data or content specifications such as may be expressed in Unified Modeling Language (UML), eXtensible Markup Language (XML), Structure Query Language (SQL), et cetera.

The knowledge automation system of the present invention preferably may generate code for one or more statements in the knowledge management system. The code generated for statements may vary from rules that hypothesize decision outcomes, to evaluation criteria that aggregate some type of score, to SQL statements that query or manipulate a database, et cetera. Any statement that uses roles that are implemented may be automated in some fashion by the present invention since, in the course of acquiring a sentence, the present invention understands which of its relationships are conditions, actions, implications, or definitions. Consequently, the present invention can generate code that examines objects, databases, XML content, et cetera and that invokes procedures such as member functions to check conditions and depending on the outcome of those checks invoke member functions or manipulate data or content according to the actions or implications of a sentence. Thus, the present invention has a significant advantage over the prior art, which can only perform limited query and update against databases. Moreover, the prior art is limited to the state of an implementation at the moment of query, not as implemented in the past or as to be implemented in the future according to a design.

The knowledge automation system of the present invention preferably may generate production rules for one or more statements. The implementation of such statements as production rules effectively implements such statements as business policies. In addition, the system may generate additional code, such as additional rules, procedural code, or SQL statements, which integrate external information, such as object models, databases, or XML content, with the production rules generated for statements. The present invention thus can generate a production system that implements large numbers of policies, regulations, and other rules in a manner that effectively automates or supports a business process, such as in decision support. The ability of the present invention to automate business process defined as a collection of sentences is a significant advantage over the prior art, which has been limited to interactive query and update rather than persistent source code for production use.

Although the production rules of the present invention can be generated as triggers within SQL databases (i.e., stored procedures) or object-oriented classes, the present invention preferably generates code for statements as production rules that are implemented using the Rete Algorithm. In this manner, the present invention allows business processes, such as in decision making, to be defined initially by hundreds growing to thousands of statements without encountering any substantial performance degradation in production use.

The present invention preferably generates production rules for a version Rete Algorithm extended to support backward chaining. In this manner, the present invention can allow statements to identify data required in a way that allows the production system to acquire information from external databases, procedures, or objects on an as-needed basis, which can be a more efficient approach than providing all possibly relevant information, such as when rules execute "in process" with an object model or "close" to a database.

Figure 14:
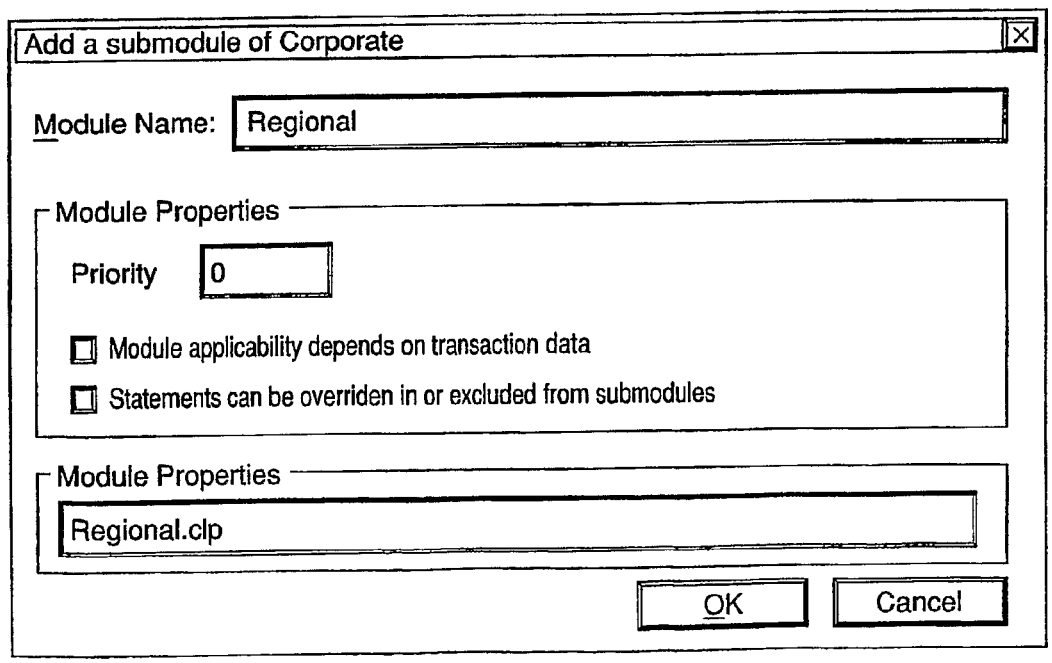
FIG. 14 is a computer screen shot illustrating the taxonomy of modules of the system of the present invention.

The knowledge acquisition system of the present invention allows statements to be organized within a taxonomy of "modules", which may be assigned relative priorities or subjected to control from procedural control. The ability to group statements and control the execution of groups of modules allows more complex business processes to be automated as collections of statements. For example, a complex business process may require that decisions be made in a certain order, such as deciding not to make an offer before determining what price to offer. Alternatively, statements may correspond to business policies within an organization with some being default and others being firm and not subject to overrides. For example, a corporate business policy may or may not be overridden at a regional or branch level. This is illustrated in FIG. 14.

The present invention preferably generates production rules for a version of the Rete Algorithm that supports such modular organization of production rules. In addition, the present invention may generate production rules in a manner that allows transaction data to determine the applicability of a module such that statements in an applicable module may effectively override statements from superior modules and that statements from superior modules may be excluded without overrides as appropriate. Thus, the present invention has a significant advantage on the prior art in that rules may be overridden or excluded in certain cases and that statements of business knowledge may explicitly be authored and managed by groups corresponding to decisions or organization structures where statements in such groups may be overridden or have exceptions, all of which is beyond the prior art.

The present invention preferably dates and times at which a statement is to become effective or expire and generates production rules for a version of the Rete Algorithm extended to maintain such times and dates such that statements become effective or expire at the times and dates specified. In this manner, the present invention advances the state of the art by allowing arbitrary business policies defined in natural language to go into or out of effect without affecting operational systems. In the prior art, only simple rules could be reflected in tables that might have effective/expiration times, but arbitrary business policies with effective and expiration times would need to be coded manually and any change would require a production software release cycle. In the event that a production rule system that supported effective/expiration times was in use, programmers trained in the technical rule language would still be involved and a production software release might still be involved.

The present invention preferably maintains a statement id across versions of a statement and generates production rules for a version of the Rete Algorithm extended with an audit callback that can receive the id of a statement for the purpose of logging the application of a statement at a time and perhaps to a case or transaction being processed. Thus, the present invention advances the state of the art by optionally providing accountability at the level of sentences, a capability which is impractical using the prior art despite the ability of certain production rule systems to audit execution at the level of rules (i.e., there is no formal relationship as between a knowledge management system for business policies and a source code control system for production rule source code). Moreover, the knowledge automation system of the present invention supports the use of such audit capabilities to run test cases and maintain a history of such cases such that the effect of changes in statements can shown for individual and across cases. Thus, the present invention advances the state of the art by providing a regression test capability for business processes defined at the level of sentences rather than for code expressed in programming languages.

A further embodiment of the invention facilitates the creation, interpretation and implementation of composite sentences.

EXAMPLE I

Composing Sentences

Further embodiments of the present invention facilitates the creation of a composite sentence as an object within a computer program comprised of a linkage between two sentence objects where said linkage includes a connective where zero, one, or both of the linked sentences may be composite. In the preferred embodiment, a sentence, whether antecedent or consequent, is treated as an object which may be stored persistently, such as in a database, or transiently, such as in the memory of software program on a computer system. The linkage composing two sentences into a composite sentence with a connective is treated as an object which may also be stored either persistently or transiently. Such sentences and linkages may persist within the transient or permanent memory of computer system as data structures, objects, files, or database content.

The present invention facilitates the creation of a composite sentence within a computer program by appending a connective to an existing sentence followed by a new or existing antecedent condition. The resulting sentence is a composite sentence. A sentence that is not a composite sentence is a base sentence. A condition is a sentence without an explicit antecedent that may itself be used as an antecedent or consequent. An action is not a condition. Therefore a sentence without an antecedent may be a condition unless it is an action. A base condition is a base sentence. As used here, an antecedent condition is an antecedent of a larger sentence. The antecedent condition may be necessary, such as an "only if" condition. It may be sufficient, such as an "if" condition. It may be contraindicating, such as "unless"; or it may be necessary and sufficient, such as "if and only if." A consequent sentence includes at least one consequent condition or action and may itself include antecedent conditions.

EXAMPLE II

User Interface Aspects of Composition

The present invention facilitates the creation of a composite sentence by dragging an existing condition and dropping it as an antecedent condition onto a consequent sentence and specifying a connective (e.g., "if", "only if", "unless", etc.) there between. This is accomplished by specifying a connective (e.g., "if", "only if", "unless", etc.) and appending text (e.g., by typing or speaking) as a base condition to a consequent sentence. The present invention also facilitates the creation of a composite sentence sharing a consequent sentence by appending multiple antecedent conditions to the same consequent sentence by typing or speaking.

In one embodiment of the invention, a composite sentence can be rendered in an outline structure within a user interface or report where multiple antecedent conditions independently appended to the same consequent sentence are rendered in a folder or simply indented within the presentation of the consequent sentence.

The present invention facilitates the creation of a composite antecedent condition by dragging an existing condition and dropping it as an antecedent condition onto another existing antecedent condition and specifying a connective (e.g., "if", "only if", "unless", etc.) therebetween. This is accomplished by specifying a connective and appending text comprising a base condition to an existing antecedent condition. Multiple antecedent conditions may be appended to the same antecedent condition. The antecedent condition can be rendered in an outline structure within a user interface or report where multiple antecedent conditions independently appended to the same antecedent condition are rendered in a folder, indented or otherwise within the presentation of that same antecedent condition. Likewise, in this format, multiple composite sentences independently appended to the same composite sentence are rendered in a folder, indented or otherwise within the presentation of that same composite sentence.

EXAMPLE III

The Semantics of Composition

A condition may be satisfied or applicable for zero or more sets of variable bindings at runtime, as determined in the results of a query (e.g., an SQL result set), the activations of production rules (e.g., using the Rete Algorithm), etc.

The present invention interprets an antecedent condition so as to be applicable for a set of variable bindings when:
  a. condition expressed within the antecedent condition itself is satisfied for a subset of the variable bindings; and
  b. ry necessary condition composed with said antecedent condition is satisfied for a subset of the variable bindings; and
  c. contraindicating condition composed with said antecedent condition is satisfied for a subset of the variable bindings; and
  d. any sufficient conditions are composed with said antecedent condition, at least one sufficient condition is satisfied for a subset of the variable bindings. and Note that when a antecedent condition has either a necessary or contraindicating condition any sufficient conditions are treated as "almost sufficient" conditions in that each is sufficient if and only if:
  (1) every necessary condition for the antecedent condition is applicable (e.g., if no "only if" condition is not applicable)
  (2) no contraindicating condition for the antecedent condition is applicable (e.g., if no "unless" condition exists or is applicable)

The present invention interprets a consequent sentence so as to be applicable for a set of variable bindings when:
  a. the condition expressed within the antecedent condition itself is satisfied for a subset of the variable bindings; and
  b. every necessary condition composed with said consequent sentence is satisfied for a subset of the variable bindings; and
  c. no contraindicating condition composed with said consequent sentence is satisfied for a subset of the variable bindings; and
  d. if any sufficient conditions are composed with said antecedent condition, at least one sufficient condition is satisfied for a subset of the variable bindings Note that when a consequent sentence has either a necessary or contraindicating condition any sufficient conditions are treated as "almost sufficient" conditions in that each is sufficient if and only if:
  (1) every necessary condition for the consequent sentence is applicable (e.g., if no "only if" condition is not applicable).
  (2) no contraindicating condition for the consequent sentence is applicable (e.g., if no "unless" condition exists or is applicable).

EXAMPLE IV

Quantification in Logical Interpretations for Sentences

The present invention interprets a sentence, whether persistently or transiently, as a logical formula in first order predicate calculus or a similar logic formalism supporting conjunction, disjunction and negation as well as existentially and universally quantified variables. The invention quantifies variables such that the domain of quantification is the set of instances or possible values for a concept, such as an entity or value, in ontology (e.g., a taxonomy of concepts in CRM).

An embodiment of the invention can interpret a sentence as a logical formula in such a logical formalism that supports exhaustive, partial, or arbitrary enumeration (e.g., sequence) in addition to existential and universal quantification (e.g., for each, some, any, etc.) Exhaustive quantification is distinct in that the statement holds (and should be used) for each binding of a variable referenced in the consequent; especially when referenced within an action. A reference to a variable within an action indicates that the action should be invoked for each binding of the variable that satisfies the antecedent. Note that action semantics are an extension of first order predicate calculus, as described further below. Partial or arbitrary enumeration is distinct in that the statement holds (and should be used) for any or some (e.g., "any 2"), but not necessarily every binding of a variable, typically referenced in the consequent, especially when reference within an action.

In another embodiment, the present invention can interpret a sentence as a logical formula in such a logical formalism that supports functional binding or quantification (i.e., that there may exist at most one value for a variable within a relationship) in addition to existential and universal quantification.

In another embodiment, the present invention can interpret a sentence as a logical formula in such a logical formalism that supports aggregation in addition to existential and universal quantification. Aggregative quantification includes the computation of any aggregate functions over at least one operand variable quantified as in an enumerative quantification indicating that the aggregate(s) is (are) to be computed over each binding (set of bindings) for the operand quantified variables. In different embodiments, aggregation may include a) counting, as in "the number of people . . . "; b) addition, as in "the total price of . . . "; and c) statistics, as in "the mean and variance of . . . "

In another embodiment, the present invention can interpret a sentence as a logical formula in such a logical formalism that supports ordering extremal in addition to existential and universal quantification. The extremal set may include: a) the maximum or minimum, as in "the oldest . . . "; b) The extremal set may include the N most extreme for N>1, as in "the 3 oldest . . . "; c) the extremal set may include more than one member for N=1 in the case of equal comparands; for example, where there is more than one person in "the oldest person(s)"; and d) extremal quantification yields at least one binding from each member of the extremal set, as in "the maximum age of a person" where a variable is available for either or both of the person or age (although there may be ambiguity in a reference to the person if more than one person is of maximum age).

In another embodiment, the present invention can interpret a sentence as a logical formula in such a logical formalism that supports uniqueness in addition to existential and universal quantification. In this context, uniqueness can mean the only member, as in, "the only person." Uniqueness may also mean unique combinations, as in "the set of ages of all people," similar to unique values or combinations as in SQL. Further, uniqueness may result from qualification of otherwise extremal quantification, as in "the only person of maximum age."

In another embodiment, the present invention can interpret a sentence as a logical formula in such a logical formalism that supports unknown quantification, whether or not qualified, in addition to existential and universal quantification where:

a. an unresolved indefinite reference (e.g., by a indefinite noun phrase, as in "a <singular common count noun>" performed without a resolving quantification)

b. an unresolved indefinite qualified reference (e.g., by an indefinite noun phrase using a relative determiner, as in "another <singular common count noun>" performed without a resolving quantification)

c. the ability to understand a base sentence that makes a definite reference that is not understood as a reference to another noun phrase within that same base sentence using unknown quantification indicating that a binding for the definite reference must be provided in order for the sentence to be converted into runtime logic, whether as rules or procedural code (including the ability to output a description of the unresolved definite reference)

EXAMPLE V

Implication Within Logical Interpretations for Sentences

The present invention typically interprets a conditional connective (e.g., "if", "unless", "then", etc.), whether within a sentence or between composed sentences, as indicating implication between an antecedent and a consequent, both with respect to sentences and their logical formulae. The present invention may implement (e.g., in rule-based or procedural programming languages) so as to assert conditions or perform actions in the consequent if the antecedent is satisfied or holds.

In one embodiment, the invention interprets the consequent of an implication to be applicable positively or negatively with respect to its antecedent (e.g., "if" versus "unless") and indicates such logic with respect to the implication with the logical formalism.

In another embodiment, the present invention may interpret an implication as having two consequents, one each of positive and negative, with respect to a single antecedent (e.g., "if then else").

In another embodiment, the present invention can indicate implication explicitly within the extended logical formalism, especially if the semantics of action is applicable, since modus ponens does not hold) using implication as a primitive connective (in addition to the standard predicate calculus connectives (i.e., "and" and "or").

EXAMPLE VI

Interpreting Natural Language Sentences

The present invention understands sentences expressed in a natural language (e.g., English) so as to implement logic so articulated within computer programs (e.g., using a rule-based programming language). This is accomplished by first interpreting a sentence as a formula in a formalism as described above; and secondly, by generating programming language code (e.g., rules) that implement such formulae. Such generated rules may, without limitation, deduce propositions; deduce possibilities (positively or negatively); recognize logical inconsistencies; and/or perform actions.

An embodiment of the present invention incorporates a conceptual role model (CRM) similar to an object role model (ORM, see http://www.orm.net) wherein a relation is defined between concepts that play roles in said relation and where a relation may have relational (i.e., copulative), functional, predicative, or action semantics.

An embodiment of the present invention incorporates linguistic modeling capabilities with which second order (i.e., model-level) sentences (called "verb phrasings") specify a correspondence between concepts (expressed as "noun phrasings") and roles within relations of the CRM. These noun phrasings may be syntactic; i.e. without a corresponding role in the CRM. Verb phrasings may include non-linguistic constraints on the CRM; for example, indicating that a role has a specific value.

An embodiment of the present invention incorporates natural language processing capabilities that parse strings (e.g., sentences) into syntactic trees in which leaf nodes are defined in a lexicon and intermediate nodes correspond to parts of speech, noun phrases, clauses, and antecedents or consequents wherein each simple noun phrase corresponds to a role within a CRM relationship and each compound noun phrase (e.g., a relative noun phrase or noun phrase with embedded prepositional noun phrase) or clause corresponds to a CRM relationship where all such roles correspond to terms within predicates each such predicate corresponding to a CRM relationship and where such terms or predicates are quantified and connected within implications in a formula corresponding to a single, plausible interpretation of such a string (i.e., sentence).

A further embodiment of the present invention deals with various forms of ambiguity by determining at least one plausible interpretation of a sentence, if any are feasible, given the grammar (e.g., of English), verb phrasings and ontology (e.g., common and proper noun phrases for concepts and instances thereof) defined. Where multiple interpretations are feasible, any of the following may be considered or combined:
1. one may be selected arbitrarily
2. disambiguating questions may be asked
3. plausible parse trees and/or resulting formulae may be presented for selection
4. heuristic preference may rank and/or select any of the above.

The invention specifically considers ambiguity arising from multiple interpretations of a lexeme (e.g., word senses), including ambiguity arising from multiple verb phrasings for a relation, multiple noun phrasings for a. concept or role, prepositional attachment, scope of negation, disjunction, etc.

An embodiment of the present invention specifically considers ambiguity arising from indefinite reference within natural language; such as singular common count noun phrases that use the indefinite article (e.g., "a" or "an" in English) which may be interpreted within a universal, existential, arbitrary, enumerative, unknown or other quantifier. Illustrative examples of these quantifiers include:
1. universal or existential; such as a man is a adult male person"
2. existential; such as "a person shot Lincoln"
3. enumerative; such as "if a person buys a house then send the person a letter"
4. arbitrary or unknown; such as "send a person to the store"

The present invention represents and stores all such natural language parse trees, transiently or persistently, in RAM-resident data structures, XML documents, and/or relational database records.

EXAMPLE VII

Interpreting Natural Language Noun Phrases

The present invention specifically interprets indefinite singular common count noun phrases as variables in a formal logic (e.g., predicate calculus) of ambiguous quantification which ambiguity may be reduced or resolved by an entire simple or compound sentence. For example, an embodiment of the invention may interpret "each" or "every" as enumerative or universal quantification. In another example, an embodiment of the invention may interpret "a(n)" as enumerative, universal, existential or arbitrary.

The present invention specifically interprets a definite singular common count noun phrase as referencing a variable. This includes, for example, use of the definite determiner "the" in English.

Further, the present invention specifically interprets a definite singular noun phrase as a unique value. An illustrative example is the known unique instance of a concept at runtime; such as where only a single loan application is considered at any one time. Another example is a value that is a specific instance known at design time (e.g., a proper noun).

The present invention also specifically interprets negatively quantified or determined noun phrases as a negated existentially quantified variable within an expression in a formal logic. For example, "if no people own a pet then the pet is a stray."

The present invention specifically incorporates the heuristic that indefinite terms in relationships involving action semantics should be grounded at runtime (e.g., in the consequent of a Home Clause or actions of a production rule) and, therefore:
   a) excluding universal or enumerative quantification (e.g., "every" or "each");
   b) if such a consequent indefinite is resolved by a variable quantified in the antecedent then such quantification should be enumerative. For example, "send a person a letter if the person is behind on a payment" should apply "for each" person that satisfies the antecedent (i.e., is behind on a payment);
   c) if such a consequent indefinite is not resolved then unknown quantification is preferred Note that universal quantification is not viable since no binding would be provided for the action invocation. Enumerative quantification is suppressed since "every" is available to resolve the ambiguity and clarify the intent if an action is to be taken for all instances. Arbitrary quantification is suppressed since "one" is available to resolve ambiguity and clarify if the action is to be taken for a single instance; as in "send a person to the store. Note that unknown quantification indicates that the consequent cannot be implemented without clarification, such as by the addition of an antecedent condition that grounds the indefinite by definite reference.

The present invention further specifically incorporates the heuristic that indefinite terms not referenced in the consequent should be existential in the antecedent. This exclude explicitly signaled enumerative or universal quantification. For example, "if every person owns a car then the car is registered;" where, given the reference in the consequent, the "car?" is the same car; the result is "ForEach(x) {{Car(x) and ForAll(y) {Person(y) and Own(y, x)}} implies Registered(x)}." In another example, "send each person to the store" will be "ForEach(x) {Person(x) implies Send(x, "the store")." In the example "if a person owns a car then the car is registered" is existential with respect to a person and enumerative or universal with respect to such a car. This heuristic reduces runtime complexity and rule executions as contrasted in:
   i. (defrule . . . (Person ?x) (Owns ?x ?y)(Car ?y)=>(Registered ?y))
   ii. (defrule . . . (Car ?x) (Exists (Person ?y) (Owns ?y ?x))=>
   iii. (Registered ?y))

The present invention may interpret a singular definite reference as requiring a referenced noun phrase to be within the scope of an un-negated enumerative, aggregative, or functional quantifier. In the event that the resolving quantification occurs within a disjunction, all disjuncts the reference must be similarly resolved in each disjunct.

The present invention may interpret an unspecified definite reference using unknown quantification. The example "send the person to the store" has an unknown definite reference.

The present invention specifically interprets fully qualified definite references to roles of unique relationships. In order to be fully qualified, the definite reference must be linguistically or logically qualified with regard to all the roles in a set for which the relation is known to be unique. In one embodiment, the invention specifically incorporates the ability to model relationships in which specified roles may be unique given all other roles of the relation. For example, the functional relation between a sum and two addends is unique for any role given the other two The present invention specifically interprets fully qualified definite references to functional results (e.g., an output role of a CRM relation with functional semantics) using functional. In order to be fully qualified the definite reference must be linguistically or logically qualified with regard to all input roles of the function. For example, "the sum of 1 plus 2" is fully qualified, while "the difference between 1" is not fully qualified. Likewise, "the prime factor of a positive integer" is not fully qualified since—excluding 1—non-prime positive integers have at least two such factors The present invention specifically interprets definite references to extremal or aggregative values of roles relationships. For example, "the oldest child of a person" is extremal. In this context, note that such references assume that the extremal reference is unique. As another example, "the number of children of a person" is aggregative.

The present invention specifically interprets unreferenced arbitrary specifications using arbitrary quantification. For example, "if any child of a person is male then the person has a son."

The present invention represents and stores all such quantified interpretations of natural language parse trees, transiently or persistently, in RAM-resident data structures, XML documents, and/or relational database records.

EXAMPLE VIII

Interpreting Natural Language Implicative Connectives

The present invention interprets connected clauses within a sentence within the logical formalism's representation of implication, including positive and/or negative antecedents and possibly sequential implications or consequents, all of which may be by reference (e.g., if composed) or value (e.g., the text of a clause). An implication represents the positive or negative dependency of a consequent upon the applicability of an antecedent or the sequential dependency of one consequent upon another (e.g., an implication may consist only of a positive consequent following another positive consequent as in a sequence of action), as in "go straight then turn left."

The present invention composes antecedent conditions into implications within the logical formalism as positive or negative (e.g., "if" versus "unless") with respect to a consequent sentence, antecedent condition, or implication.

The present invention composes consequent sentences into implications within the logical formalism as positive or negative (e.g., "then" versus "otherwise") with respect to a prior or subsequent antecedent condition, consequent sentence, or implication.

The present invention interprets certain connectives (e.g., "if") as preceding a (almost) sufficient antecedent condition for which consequents may occur in a sentence or formula before the connective or after the condition that follows the connective, usually after a connective following said condition (e.g., "then").

The present invention interprets certain connectives (e.g., "unless") as preceding a contra-indicating antecedent condition and other connectives (e.g., "only if") as preceding a necessary antecedent condition. An example is "yell if a hammer falls on your toe"

The present invention typically interprets an unconnected sentence preceding certain connectives that may indicate an antecedent condition as a consequent sentence participating in any resulting implicative interpretations.

The present invention interprets certain connectives following an antecedent condition (e.g., "then" or "in which case") as preceding a consequent sentence participating in any resulting implicative interpretations.

The present invention interprets certain connectives following a consequent sentence (e.g., "then" or "and furthermore") as preceding an additional consequent sentence participating with the former consequent sentence in any resulting implicative interpretations if said consequent sentence involves no action.

The present invention interprets certain connectives following a consequent sentence (e.g., "then" or "after which") as preceding an additional consequent sentence to be applied only after (whether or not immediately after) any action in the prior consequent sentence.

The present invention interprets certain connectives following a consequent sentence (e.g., "otherwise") as the consequent sentence of opposite logic from that of the preceding consequent sentence sharing its antecedent condition. In "if A then B otherwise C" both B and C are consequent sentences covering opposite logic (i.e., positive and negative) with respect to their implication's antecedent.

The present invention represents and stores all such quantified interpretations of natural language parse trees involving implication, transiently or persistently, in RAM-resident data structures, XML documents, and/or relational database records.

EXAMPLE IX

Implementing Quantifiers Within Logical Interpretations

The present invention specifically incorporates the heuristic that interpretations from which rules may be generated where all variable references are resolved in the antecedent of the interpretation and any such generated rule(s).

The present invention resolves any variable reference in the consequent by a variable quantified in the antecedent where the scope of such quantification encompasses the consequent so that any propositions asserted in the consequent are grounded and so that all input parameters of any procedural invocation receive values. All terms in a relationship with procedural semantics must (in order to be implemented by invoking a procedure) be either constants or variables resolved within the scope of an un-negated enumerative, aggregative, extremal or functional quantifier (since an existential, quantified, or negated binding cannot provide a value for a parameter of a procedure.)

In another embodiment, the present invention interprets a linguistic consequent as a logical antecedent so as to resolve variable references within the logical antecedent with values specified in the linguistic consequent. In "if a person is a citizen then (s)he votes in the state in which (s)he resides" the reference to state of residence in the consequent would be implemented by a rule that determined the state of residence in its antecedent. Note that semantically, the state of residence is not being deduced and, hence, may be moved to the logical antecedent without affecting the meaning of the sentence i) e.g., "if a person who is a citizen resides in a state then (s)he votes in the state." In contrast, a deduction or action invocation may not be moved from the consequent. A relationship with action semantics (i.e., that the existence of such a relationship corresponds to the invocation of a procedure with side effects) must be expressed within the consequent of the logical formula. Note that a functional quantifier provides ground values (i.e., bindings for its output parameters) given ground values for its input parameters.

The present invention rejects any interpretation that resolves a variable reference that must remain in the consequent using a negated, universal or existential quantification since such a quantified variable is typically not to be asserted in a proposition or passed as an input parameter to a procedure. Unknown quantification is assumed if such rejection would result in no further possible resolutions of said variable reference. Note that universal or existential quantification extending into the consequent may also be implemented as rules that check for logical consistency, as described herein. A reference to a variable receives no binding from (i.e., cannot be resolved (other than as a skolem function) during runtime inference or invocation of actions by) a negated or existential or universally quantified variable but may be resolved by an enumerative (e.g., "for each"), aggregative (e.g., "the total of)," unique (e.g., "the only"), arbitrary (e.g:, "any"), extremal (e.g., "the first" or "the highest"), or functional quantification of the referenced variable. For example, if every person has a spouse then the person is married; if a person has at least one spouse then the spouse is married; and if a person has no spouse then the spouse is not married.

EXAMPLE X

Implementing Logical Interpretations as Rules

With regard to the correspondence between logical formulae in the extended formalism and subject to the quantification preferences and constraints expressed above:

A logical formula requires a consequent and may not necessarily involve an antecedent, each of which is also the case for a rule.

A logical formula without implication is a consequent and a consequent with no antecedent is a fact or action to be taken unconditionally. Note that the present invention supports implication between formulae such that a logical formula without implication may act as an antecedent rather than a consequent depending if it is connected to a consequent. An arbitrary logical formula may be converted into a normal form, including conversion such that the resulting logical formula's only use of disjunction is between formulae that do not themselves involve disjunction. A logical formula in such a logical formalism may not be converted into such a normal form if implication (i.e., the distinction between antecedent and consequent) should be preserved (such as if a consequent includes an action.)

With regard to any antecedent of a logical formula, it may correspond to the antecedent of a rule, as in, without limitation, Home Clauses (e.g., Prolog) or production rules (e.g., as supported in any of various versions of the Rete Algorithm and its derivatives, such as OPS5, CLIPS, JESS, etc.) if the antecedent of the logical formula involves disjunction then each disjunct in the antecedent's disjunctive normal form (DNF) may be treated as the set of corresponding logical formulae each of which has such a disjunct as its antecedent and the consequent of the original, disjunctive formula. Further, if the implementing rule technology supports disjunction (either of terms within predicates or across predicates) conversion to multiple rules via DNF can be eliminated or reduced accordingly With regard to the consequent of a logical formula, it may correspond to the consequent of a rule, as in, without limitation, the head of a Home Clause or the actions of a production rule:

A variable reference in a consequent (e.g., the head of a Home Clause rule or the actions of a production rule) must reference a binding in the antecedent of the same rule. A variable reference may occur to a binding in the actions of a rule. All terms within any tuple in the consequent are literal values or references to variables bound in the antecedent such as a) within enumerative or functional quantification or b) where such a binding must arise outside of negation or universal or existential quantification or a disjunction in which a binding may not arise within any disjunct. For instance, "if a person owns a book or a car then request the book" is invalid, while "if a person owns a book or a car then request the item" is valid.

The consequent uses no disjunction involving any tuple or term within a tuple. because most rule-based systems cannot assert a disjunction as a value, not can they assert a disjunction of propositions. The consequent uses no negation of any tuple or term within a tuple. It involves no quantification whose scope is limited to the consequent.

If all logical interpretations for a sentence involve unknown quantification then the sentence cannot be implemented without resolution of such binding(s) by composition.

If all logical interpretations for a sentence involve any of negation, disjunction, or quantification in their consequent then implementing rules cannot be generated for typical rules technology (e.g., Home Clause or production rules) but rules to detect logical inconsistencies or perform meta-logical reasoning (as described further below) may be implemented.

If a logical interpretation for a sentence involves no negation, disjunction, or quantification in its consequent then it is "implement-able" in that a corresponding rule (a production rule, for example) can be implemented in direct correspondence to the logical interpretation possibly requiring multiple rules each with an antecedent corresponding to a disjunct of the original antecedent in DNF. It is also possible to leverage truth maintenance capabilities of the implementing rule technology for deductive conclusions (i.e., other than irreversible procedural invocation, e.g., of actions) so as to maintain logical soundness in the event the logic is non-monotonic. Specifically leveraging logical dependencies based on the Rete Algorithm so as to maintain logical soundness (with or without loop detection) in the event that the specified logic is non-monotonic including asynchronous changes to propositions in working memory especially under the closed-world assumption. In one embodiment, "infer" in Eclipse syntax is used.

The present invention implements enumerative quantification in production rules by chaining (i.e., multiple applications of a specific rule, one application per member of the enumerable set). For example, the following sentence and rule would apply for any number of bindings of the variable ?x for each applicable person:

"if a person is an adult male then he is a man"
(person ?x)(male ?x)(adult ?x)=>(infer (man ?x))

Arbitrary quantification in production rules may be implemented as in enumerative quantification using a quantifier, as is supported by Eclipse, as in one embodiment:

"if any child of a person is male then the person has a son"
(any (person ?x)(male ?x)(adult ?x))=>

Or a negated condition is used to limit the enumeration, such as using negation as in:

(not (some ?x))(person ?x)(male ?x)(adult ?x)=>(assert (some ?x) . . . )

Extremal quantification in production rules may be implemented as in enumerative quantification using a quantifier such as "max" or "min" to be supported in Eclipse (max ?age (age ?person ?age))

Non-unique max may execute (by chaining) more than once if the maximum is not unique. In another example, extremal quantification in production rules may be implemented with a specification for whether uniqueness or the N most extreme should be allowed, as in:

(max unique ?age (age ?person ?age))
(max 2 ?age (age ?person ?age))

The order of identical values is arbitrary (e.g. when 1 is specified when the max is non-unique).

EXAMPLE XI

Implementing Compound Sentences

If a logical formula is an antecedent of another logical formula (e.g., a consequent sentence has one or more, possibly nested antecedent conditions or consequent sentences), the present invention determines whether to include, directly or indirectly, the implementation of the antecedent of the implying formula, including a prior consequent, within any rules that implement the implied formula.

In the embodiment which directly includes the implementation of the antecedent of the implying formula within implement rules, as in to concatenate the implementation of the implied and the implying antecedents, especially doing so in a manner that leverages the Rete Algorithm to share computations across any redundant expression of the implying antecedent, as in sharing the pattern matching operations (i.e., the alpha nodes) and the join matching operations (i.e., the beta nodes). Further especially by implementing such rules so as to share the implying antecedent as a prefix across implementing rules or as an inner join within implementing rules. Note that such inclusion (whether prefix, infix, or suffix) is further complicated by any parallel composition (e.g., of additional antecedent conditions) such that inner joins or indirect reference as set forth below is typically utilized in the case of multiple compositions.

In the embodiment which indirectly includes the implementation of the antecedent of the implying formula within implement rules, as in referencing the result of prior computation within the implementation of the antecedent of the implied formula or setting a variable or storing data in the procedural implementation of the consequent of the implying formula (or otherwise after computing the antecedent of the implying formula) which variable or stored data is consulted in checking the antecedent of the implied formula's antecedent. The rule implementing the implying formula asserts a proposition representing the application of the implying formula.

Alternately, an additional rule corresponding to the composition asserts a proposition representing the (in)applicability of the implying formula. Examples include the inapplicability for a sole sufficient condition; the applicability for one or more sufficient conditions; the applicability for necessary or contraindicating conditions or the inapplicability for necessary or contraindicating conditions.

Alternately, the implementation of the antecedent of the implied formula within a rule includes additional consideration of the propositions so asserted such that (1) if the implied formula is composed with one or more necessary formulae that every such formula is applicable; or (2) if the implied formula is composed with one or more contraindicating formulae that no such formula is applicable; or (3) if the implied formula is composed with one or more sufficient formulae that one such formula is applicable or has been applied.

The present invention joins any sufficient, necessary, or contraindicating condition above with an additional condition representing that said antecedent condition as indicated (i.e., has an applicable sufficient condition, if any are indicated, no indicated necessary condition that is inapplicable and no indicated contraindicating condition that is applicable.) For example, (and (or (and <sufficient condition a>(indicated 1 a)) . . . )
(and (and <necessary condition b>(indicated 1 b)) . . . )
(not (or (and <disjunctive condition c>(indicated 1 c)) . . . )
<antecedent of implied formula>)
=><consequent of implied formula>

The present invention may use positive or negative logic (e.g., open or closed-world assumptions) in the consideration of implying conditions within the antecedents of rules, implementing implied formulae where positive logic for propositions representing applicability of sufficient formulae is used in the antecedents of rules implementing implied formulae. Disjunction may be used across multiple sufficient conditions of an implied formula. Alternately, positive logic for propositions representing the applicability of necessary formulae is used in the antecedents of rules implementing implied formulae. Conjunction may be used across multiple necessary conditions of an implied formula.

Negative logic for propositions representing the applicability of contraindicating conditions is used in the antecedents of rules implementing implied formulate. Negation of a disjunction (or a conjunction of negated conjuncts) is typically used across multiple contraindicating conditions of an implied formula.

The present invention may substitute single existentially quantified conditions for some or all of the disjunctions within disjunctions of sufficient conditions in the antecedents of rules implementing implied formulae. In this case, the rules that infer propositions representing the applicability of implying formulae assert a uniform representation that identifies an implied formula and which may identify the implying formula. All sufficient conditions must resolve any unknown quantification in implied formula that are not resolved by sibling necessary conditions and the inferred propositions must include the bindings for those unknown quantifications. Existence may collapse disjunction over multiple sufficient conditions into a single quantified condition provided that the single condition used within the existential quantifier matches any and all propositions representing the applicability of sufficient conditions. For example, (exists (sufficient 1 ? $?)); where (sufficient 1 a) might represent that sufficient condition "a" holds for implied formula 1 and the absence of additional values implies that no unknown quantifications are resolved by any sufficient condition.

Note that existential quantification is not required if sufficient conditions are not identified in inferred propositions such that the same proposition would be inferred for any sufficient condition. For instance, (sufficient 1) might correspond to the above implementation albeit without identifying the specific sufficient condition.

Note that existential quantification may be eliminated in the case of one sufficient condition which acts, in effect, as a necessary condition The present invention infers sufficient conditions for implied formulae using additional generated rules that infer propositions representing the satisfaction of sufficient conditions of implied formulae from the propositions representing the applicability of implying formulae.

Rules generated to infer propositions representing the applicability of sufficient implying formulae may be independent of any composition of the implying formulae if they resolve no unknown quantifications within the transitive closure of the composition's implied formulae. Such rules may generally be independent of rules generated for the broader implying formula, but may result in excess application if one or more variables are referenced between narrower and broader formulae. This is the most generalized case of including a generalization of implied formulae' antecedents in the implementation of implying formulae' antecedents. In the most specialized case, un-generalized antecedents of implied formulae are included in the implementation of implying formulae' antecedents.

In the general case, the proposition asserted to represent the applicability of an implying formula identifies the implying formula and all variable bindings referenced in its implied formulae but not resolved within necessary formulae. Additional rules may infer that sufficient conditions are satisfied for implied formulae if any sufficient condition is applicable. For example, (indicated 1 "a" ?x) (condition "a" ?y)=>(sufficient 1 ?x ?y). Note that rules generated for sufficient conditions may include necessary and/or contraindicating conditions such that efficiently computable necessary or contraindicating conditions may reduce computation of sufficient conditions.

The present invention generates rules that infer that sufficient conditions of implied formulae are satisfied if no sufficient condition is indicated by rules that are generated when all sufficient conditions have nested applicability conditions. In another embodiment, an inapplicable condition is treated the same as a condition that does not hold.

Such generated rules can infer that sufficient conditions of implied formulae are satisfied when no sufficient conditions are indicated. For example, (not (indicated sufficient 1 ?)) matches when no sufficient condition for implied formula 1 is indicated and may infer (sufficient 1) which indicates that at least one sufficient condition, if any, are indicated (or zero if none exist or are applicable) for formula 1. That is provided that sufficient conditions need not resolve any unknown quantification in implied formulae that are not resolved by sibling necessary conditions. Note that such rules are not necessary for implied formulae that have implying formulae (e.g., applicability conditions) that have no nested implying formulae.

The present invention may infer necessary conditions for implied formulae using additional generated rules that infer propositions representing the satisfaction of necessary conditions of implied formulae from the propositions representing the applicability of implying formulae. For example, as above for (sufficient $?) albeit substituting as in (necessary $?).

The present invention may substitute single negated patterns for conjunctions of necessary conditions within the implementations of implied formulae' antecedents by implementing additional rules that infer that necessary conditions are not satisfied. For instance, (not (necessary 1 a true))=> (necessary 1 a false); or (not (condition a))=>(necessary 1 false). Such additional rules may consider whether they are indicated by nested applicability conditions by incorporating an indication condition. An example is (indicated 1 a) (not (necessary 1 a true))=>(necessary 1 false). A pattern recognizing that a necessary condition is not known to hold as the substituting condition may also be used, such as where (not (necessary 1 false)). Note that negation cannot be used to substitute for necessary conditions that reference variables quantified within the antecedents of the implied formula or that which resolve unknown quantifications within the implied formula.

The present invention may substitute single positive patterns for some or all or the conjuncts in conjunctions of necessary conditions within the implementations of implied formulae' antecedents. In one embodiment, this is done by implementing additional rules where possible as set forth immediately above. This may also be done by implementing additional rules that infer the satisfaction of necessary conditions for the subset of bindings of variables referenced and unknown quantifications resolved. Note that conditions for applicable indicated necessary conditions may be included in the antecedent of these rules if the set of bindings produced by such necessary conditions are a subset of those produced by the rule and thereby creating a partial ordering among necessary conditions and optionally eliminating inclusion of conditions for prerequisite necessary conditions.

In another embodiment, this is done by implementing an additional rule that infers the full set of bindings from the union of subsets at the leaves of the partial ordering of necessary conditions and referencing such propositions in the pattern substituted for the conjunction of indicated necessary conditions. Note that implied formulae that have necessary conditions that resolve unknown bindings cannot be indicated if none of the necessary conditions that resolve an unknown binding are indicated unless indicated sufficient conditions resolve all unknown quantifications not resolved by indicated necessary conditions. An additional generated rule may infer that necessary conditions are satisfied for a subset of unknown quantifications resolved by indicated sufficient conditions.

The present invention may infer contraindicating conditions for implied formulae using additional generated rules that infer propositions representing the satisfaction of contraindicating conditions of implied formulae from the propositions representing the applicability of implying formula. For example, as above for (sufficient $?) or (necessary $?) albeit substituting as in (contraindicating $?).

Further, such rules may use positive or negative logic to infer that the contraindicating condition is true or false (i.e., is applicable or inapplicable). Examples include: (not (<contraindicating condition a>))=>(contraindicating 1 a false); or <contraindicating condition b>=>(contraindicating 1 true). Note that contraindicating conditions that reference variables from their implied formulae may not be negated since to do so would preclude asserting the bindings contraindicated.

The present invention may substitute single negated patterns for some or all of the disjuncts in disjunction of contraindicating conditions within the implementation of implied formulae' antecedents. This is done by implementing additional rules that infer that contraindicating conditions are satisfied, such as (not (contraindicating 1 a false))=>(contraindicating 1 true).

Such additional rules may consider whether they are applicable according to nested applicability conditions by incorporating an indication condition. For example, <contraindicating condition b>(indicated 1 b)=>(necessary 1 false); or <contraindicating condition b>(indicated 1 b)=>(contraindicating 1 true). A pattern recognizing that a contraindicating condition is not known to hold as the substituting condition may be used, such as (not (contraindicating 1 true)). Note that backward chaining may be utilized to determine whether conditions contraindicate an implied formula by specifying that determining any subset of the bindings before the generated rule will cause a sub-goal for contraindication.

The present invention may combine any reference to sufficient, necessary, and contraindicating conditions into a single pattern by implement in an additional rule that infers a condition of applicability for a possibly empty set of variable bindings where the antecedent of such a rule references the satisfaction of sufficient conditions (if any) for a set of bindings, the satisfaction of necessary conditions (if any) for a set of bindings; and the lack of satisfaction of necessary conditions (if any) for a subset of the union of the sufficient and/or necessary bindings (if any) and the consequent infers the applicability of the implied formula for said union. For example, where (sufficient 1 ?x ?y) and (necessary 1 ?x ?z) and (contraindicating 1 ?y ?z)=>(indicated 1 ?x ?y ?z).

In another embodiment, this may be implemented in a more specialized manner, with negation on individual contraindicating conditions.

The present invention typically uses priority to compute applicability conditions before applying implied formula at runtime and/or procedural control to execute rules that infer propositions representing indication (including sufficient, necessary, and contraindicating propositions) before rules that infer consequents (e.g., take action).

The present invention introduces inner joins and/or drop applicability conditions in implementing rules that infer propositions indicating the applicability of a condition so as to share computations across antecedent conditions that are involved in multiple compositions. In another embodiment, inner joins are used but applicability conditions are not dropped.

Inner joins increase sharing of computations in all cases but may increase total computation if nested applicability conditions do not indicate the need for such computations. Dropping applicability condition from rules that infer propositions representing conditional applicability is appropriate if the same inference occurs elsewhere without indicating conditions or if all indicating conditions cover the space of possibilities such that applicability will be computed in any case; especially where the runtime implementation and computations for the implying antecedent are implemented so as be shared as an inner join (including common prefixes) across multiple rules using the Rete Algorithm.

EXAMPLE XII

Implementing Compound Sentences Without Unknowns

An antecedent condition involved in one or more composite sentences but which resolves no reference within any sentence with which it is composed may be implemented independently of the sentences with which it is composed provided that the potential applicability of the antecedent sentence is considered within the implementation of any such composite sentences (e.g., by reference to the consequent of a generated rule or results of an invoked procedure.)

Each such antecedent condition may correspond to a predicate referenced within the implementation of each consequent sentence for which it is an antecedent condition. The antecedent condition may be expressed as a Boolean procedure requiring no arguments and called from the implementing code for each of its consequent sentences (including optimizations such as replacing the procedure call with a reference to a Boolean variable.) Alternately, the antecedent condition may be expressed as a rule the antecedent of which is the antecedent condition and the consequent of which is a nullary proposition that is asserted when the antecedent condition is or is not satisfied. In another alternative, the antecedent condition may be expressed as a rule the antecedent of which is the antecedent condition and the consequent of which is a unary proposition with an argument identifying the antecedent condition that is asserted when the antecedent condition is or is not satisfied. In each case above, the invoking code within the implementation of each consequent sentence effects the connective (e.g., "if", "only if", "unless", etc.) used in the composition or the consequent sentence and the antecedent condition.

Each such antecedent condition may correspond to an inline computation within the implementation of each consequent sentence for which it is an antecedent condition. The inline computation may specifically correspond to the use of an inner join within an SQL statement where the encompassing SQL statement may correspond to the composite sentence containing the antecedent condition. Alternately, the inline computation may specifically correspond to a series of conditions expressed in rule-based language. In another alternative, the inline computation may specifically correspond to a join of conditions expressed in a rule based language. The inline computation may specifically correspond to a prefix or inner join shared across rules using rule-based algorithms such as the Rete Algorithm.

The present invention generates rules for antecedent conditions with implement-able interpretations independently of the consequent sentences with which they are composed, where the consequent is a propositional assertion that indicates whether the antecedent condition holds. The antecedent of said generated rules corresponds to the antecedent condition. The consequent of such generated rules infers a proposition representing that the condition holds. Such generation may be suppressed if no consequent sentence with which said antecedent condition is composed can be implemented given variable binding and reference constraints, negative or disjunctive inference limitations, etc.

Each such generated rule is independent of its consequent base sentence and infers at least one fact representing the applicability of the conditions expressed within the antecedent sentence, the assertion of which fact at runtime influences the applicability of any rule generated for its consequent sentence. If the antecedent base sentence is sufficient or almost sufficient, the rule represents that at least one sufficient condition of the consequent base sentence is applicable. If the antecedent base sentence is necessary, then the rule represents one or more of the following: 1) that the necessary condition is known to be applicable or not to be so; and/or 2) the necessary condition is assumed to be applicable or not to be so, if not known to be otherwise as immediately above. If the antecedent base sentence is contraindicating, then the rule represents one or more of the following: 1) that the contraindicating condition is known to be applicable or not to be so; and/or 2) the contraindicating condition is assumed to be applicable or not to be so, if not known to be otherwise as immediately above.

Each such generated rule is independent of any other antecedent conditions of its consequent base sentence. Further, except that such generated rule may infer the same or substantially similar facts indicating the satisfaction or lack of satisfaction of almost sufficient, necessary, or contraindicating conditions of the consequent base statement. As an example, the composite A if B if C unless D only if E, assuming that A B C D E are sentences importing/exporting no variables, could be implement by the following rules:

(exists (condition "B"|"C")), or alternatively, (or (condition "B") (condition "C"))
    (not (condition "D"))
    (condition "E")
    =>
    (infer A)
    B=>(condition "B")
    C=>(condition "C")
    D>(condition "D")
    E=>(condition "E")

The present invention generates independent rules (particularly in the case of a disjunction of almost sufficient antecedent conditions) where the consequent includes an assertions specific to a consequent sentence with which the antecedent condition is composed. For example, given the two rules:

A if B if C
    D if B if E the following rules implements the logic:

B=>(sufficient "A")
    B=>(sufficient "D")
    C=>(sufficient "A")
    E=>(sufficient "D")
    (sufficient "A")=>A
    (sufficient "D")=>D Note that the present invention may specifically realize efficiencies using the Rete Algorithm by the introduction of inner joins and the sharing of antecedent prefixes, as for the rules having B in their antecedent immediately above.

Further, the present invention generates compound consequents within rules implementing antecedent conditions composed with more than one consequent sentence where the consequent may include multiple assertions each specific to a consequent sentence with which the antecedent condition is composed along. For example, the preceding rules having B in their antecedent might be implemented as:

B=>(sufficient "A") and (sufficient "D")

The present invention generates rules for consequent sentences with implement-able interpretations. Such rules incorporate the antecedents of any antecedent conditions composed with said consequent sentence directly. For example, the composite "A if B if C unless D only if E" (assuming A B C D E are sentences importing/exporting no variables) could be implement by the rule "(OR B C) (not D) E=>A."

In another embodiment, backward chaining may be used.

Generated rules for antecedent conditions may include a condition or conditions based on the other applicability conditions composed with the same consequent sentence. Rules generated for an (almost) sufficient antecedent condition may include conditions indicating necessary or precluding contraindicating conditions. Rules generated for necessary and/or contraindicating conditions may include conditions indicating other necessary and/or contraindicating conditions. Such inclusion of co-composed antecedent conditions may specifically arise from necessary and/or sufficient conditions that may be efficiently computed and/or which are of high or low probability. For example, the composite "A if B if C unless D only if E" (assuming A B C D E are sentences importing/exporting no variables) could be implemented by the following rules:

(1) (exists (condition "B"|"C"))
    (not (condition "D"))
    (condition "E")
    =>
    (infer A)
    (2) (condition. "E") B=>(condition "B")
    (3) (condition "E") C=>(condition "C")
    (4) D=>(condition "D")
    (5) (not (condition "D")) E=>(condition "E")

The present invention may (e.g., recursively) generate rules for an antecedent condition as in the generation of consequent sentences above wherein the rules generated for an antecedent condition reference the propositional assertions of rules generated for antecedent conditions composed with the first antecedent condition.

The present invention supports antecedent conditions for antecedent conditions being "indicated" based only upon indicated antecedent conditions by determining an antecedent condition to be indicated only if all of the following are satisfied:

a) every indicated necessary condition for the antecedent condition, if any, is applicable. For example, if no indicated "only if" condition is not applicable.
    b) no indicated contraindicating conditions for the antecedent condition, if any, are applicable. For example, no indicated "unless" condition exists or is applicable.
    c) at least one indicated "almost sufficient" condition for the antecedent condition, if any, is applicable. For example, at least one indicated "if" condition is applicable or where no "if" condition is indicated.
    d) Note that an antecedent condition with no further antecedent conditions is indicated. For example, the composite "A if B if C unless D only if E" (assuming A B C D E are sentences import/exporting no variables) could be implemented by the following rules:

(1) B=>(condition "B")
    (2) C=>(condition "C")
    (3) D=>(condition "D")
    (4) E=>(condition "E")
    (5) (condition "B")
    (condition "C")
    (not (condition "D"))
    (condition "E")
    =>
    A The present invention may also determine applicability using backward chaining. For example, (goal (condition "B")) B=>(infer (condition "B")), where the computation of B would not be incurred if the last rule above was not in context (e.g., if the set of rules including A was not applicable).

e) any antecedent expressed within the consequent sentence itself is satisfied

Generated rules for antecedent conditions or consequent sentences may include a condition or conditions corresponding to applicability conditions of a set of rules (e.g., the module in which they are composed).

The order in which a consequent rule checks the components of its applicability (at least one of any disjunctively sufficient set of conditions, every necessary condition, and no-contraindications) can have a significant effect on performance. The items to be ordered include:

a) a pattern requiring at least one of the rule's disjunctively sufficient conditions to be applicable and satisfied;
   b) a pattern requiring none of the rule's contraindicating conditions to be applicable and satisfied; and
   c) a pattern for each necessary condition of the rule, requiring that condition to be applicable and satisfied An ordering may be selected according to the following criteria:

a) Any arbitrary ordering could be used without concern for correctness;
   b) Patterns likely to be satisfied less often should be placed before patterns likely to be satisfied more often, because this will typically result in reduced combinatorics. The expected rate of satisfaction of a pattern can be estimated:
      (1) by static analysis of the conditions; for example, 1 or many to 1 or many relations; whether or not a role must participate in relationships; whether or not a relationship is unique for a set of roles; and estimates of expected and worst case cardinality of a relation for a set of roles
      (2) empirically from a deployed system The present invention may generate rules that use backward chaining to determine whether a condition is applicable and avoid unnecessary computation. For example, (goal (condition "B")) B=>(infer (condition "B"))

where the computation of B is triggered only when another rule needs to know whether condition B is satisfied. If the computation of B is costly, backward chaining avoids the computation when its result is not needed.

The present invention decides for each condition whether to use forward or backward chaining. Backward chaining should be used when it will likely avoid unnecessary computation. Forward chaining should be used when backward chaining is not expected to eliminate any inferences, because forward chaining is more efficient than backward chaining for the same set of inferences.

EXAMPLE XIII

Implementing Compound Sentences With Unknowns

The present invention may resolve unknown quantification in a consequent sentence by a quantification of a variable in an antecedent condition with which it is composed only if the type logic (e.g., ontological) constraint within the resolving quantifier of the antecedent condition is compatible with (e.g., is filled by the same CRM concept) that of the unknown quantification and only if the resolving quantification is enumerative, aggregative, extremal, functional, or arbitrary unless the quantification within the antecedent is negated.

The present invention may similarly (and recursively) resolve unknown quantification in a consequent sentence by a quantification of a variable in an antecedent condition of an antecedent condition composed with the consequent sentence.

The present invention can generate rules that implement the logic within any composite sentence for a composition of logical interpretations with no unresolved unknown quantification where such resolved logical interpretation meets the requirements for consequent bindings and propositional equivalence (e.g., lack of negation or disjunction in or of assertions).

The present invention may generate such rules for composite sentences that involve no more than a single condition per level of composition by concatenating the antecedents from each level (with negation of contraindicating conditions) for each level of such concatenation.

The present invention may generate such rules for composite sentences that involve no more than a single sufficient condition per level of composition by concatenating the antecedents from each. level with conjunction across necessary conditions and negated disjunction (or conjunctive negation) of contraindicating conditions for each level of such concatenation.

The present invention may generate such rules for a composite sentence involving multiple sufficient conditions. for a consequent sentence or antecedent condition as above using disjunction across the concatenations of each such sufficient condition (including, for example, an inner join of said sufficient condition's antecedent conditions, if any).

The present invention may generate such rules by substituting a generated condition (i.e., a propositional pattern) for any part of the antecedents resulting from such concatenation along with an additional generated rule that asserts a proposition corresponding to the generated condition so substituted.

The present invention typically generates such rules so as to share the computation involved in asserting such generated conditions across multiple compositions by sharing the antecedents across generated rules (e.g., as in the Rete Algorithm).

The present invention is specifically effective at generating such rules so as to simplify the antecedent of rules for consequent sentences by minimizing the number of generated conditions introduced into such rule antecedents by combining any of the following techniques according to various heuristics:

a) by sharing a single generated condition across some or all sufficient conditions
      1) i.e., occurring within the antecedent of the consequent sentence
      2) and inferred in the consequent of rules generated for such sufficient conditions
   b) by asserting a condition indicating satisfaction of a sufficient condition
      1) only if some or all necessary conditions are applicable
      2) and/or unless some contraindicating condition is applicable
      3) i.e., by incorporating generated conditions for such conditions within the rules generated for sufficient conditions.

The present invention typically generates rules to reduce the computation involved in checking the antecedents of consequent sentences having inapplicable antecedent conditions or to increase the sharing of computation involved in check the antecedents of consequent sentences across multiple rules by positioning such generated conditions before or positioning them after the antecedent of consequent sentences or omitting them entirely at the risk of additional forward chaining (which may be reduced by inserting goal conditions).

The present invention specifically generates such rules in a manner where each is independent of each of the antecedents in antecedent conditions composed with it but which, in the worst case, includes the following:

a) if the consequent sentence has any sufficient conditions, at least one condition each of which corresponds to at least one sufficient condition. If more than one such condition occurs they are disjunctive.
- b) if the consequent sentence has any necessary conditions, at least one condition each of which corresponds to at least one necessary conditions. If more than one such condition occurs they are conjunctive.
- c) if the base sentence has any contraindicating conditions, at least one condition each of which corresponds to at least one contraindicating condition. If more than one such condition occurs their disjunction is negated.
- d) if any such conditions do not resolve an unknown quantification then a single condition representing the applicability of some (or all) such sufficient or necessary condition(s) may be included in the antecedent.
- e) if any such condition resolves an unknown quantification then the included condition for such conditions includes one argument per such resolution and represents the applicability of some (or all) such sufficient condition(s).
- f) the relationship between antecedent conditions and such rule conditions is at least one to one but possibly many to one, as described above in each case.

The present invention effectively resolves unknown quantification within an antecedent condition by conjoining the antecedent condition with the antecedent of the consequent sentence, if any, subject to the disjunction of almost sufficient conditions, if any, and the conjunctions of necessary and contraindicating conditions, respectively, if any. For example, the rule "A(x) if B(x) if C(x) only if D(x) only if E(x) unless F(x) unless G(x) could be implemented as follows:

(or (B ?x) (C ?x))
(and (D ?x). (E ?x))
(and (not (F ?x)) (not (G ?x)))
=>
(A ?x)

Note that in order implement the composite statement without overlooking or changing its logic as defined above, either at least one necessary condition must resolve an unknown binding, or all almost sufficient conditions must resolve the unknown binding.

The present invention may generate rules for the resolving antecedent condition with a consequent sentence that asserts the binding that resolves the unknown quantification where such asserted propositions are referenced by conditions added to the antecedent, if any, of the consequent sentence. The base case involves a variable in a consequent sentence (or antecedent condition) resolved immediately within all sufficient conditions or a necessary condition. For example, the rule "A(x) if B(x)" could be implemented as in (B ?x)=>(sufficient "A" ?x)
(sufficient "A" ?x)=>(A ?x)

The induction step involves a variable in a consequent sentence (or antecedent condition) resolved transitively within all sufficient conditions or a necessary condition. For example, the rule "A(x) if B(x) if C(x) only if D(x) only if E(x) unless F(x) unless G(x)" could be implemented as

- a) (sufficient A ?x)
  (necessary A ?x)
  (not (contradicting A ?x))
  =>
  (A ?x)
- b) (or (B ?x) (C ?x)=>(sufficient A ?x)
- c) (and (D ?x) (E ?x))=>(necessary A ?x)
- d) (or (F ?x) (G ?x))=>(contradicting ?x)

The present invention may use the various techniques described above for antecedent conditions that resolve unknown quantifications to limit the antecedents of implied formula in accordance with applicable antecedent conditions. For example, the rule "B(x)=>A(x) if C(x)" could be implemented as

- a) (C ?x)=>(sufficient B-A ?x)
- b) (sufficient B-A ?x) (B ?x)=>(A ?x)

The present invention may use the various techniques described above for antecedent conditions of other antecedent conditions which transitively resolve unknown quantifications or reference bindings from the consequent sentences or antecedent conditions that they narrow. For instance, the rule "A(x, y) if B(x) if C(x, y)" through forward chaining assertion of bindings for narrowing conditions referenced in broader applicability conditions and/or antecedents of consequent sentences could be implemented as (1) (C ?x ?y)=>(indicated A-B ?x ?y)
(2) (indicated A-B ?x ?y) (B ?x)=>(indicated A ?x ?y)
(3) (indicated A ?x ?y)=>(A ?x×?y)

In another embodiment, through backward chaining by sub-goal generation from broader applicability conditions and/or antecedents of consequent sentences, the rule could be implemented as in:

(1) (indicated A ?x ?y)=>(A ?x×?y)
(2) (goal (indicated A ? ?)) (3 ?x) (indicated A-B ?x ?y) =>(indicated A ?x ?y)
(3) (goal (indicated A-B ?x ?)) (C ?x ?y)=>(indicated A ?x ?y)

In another embodiment, through incorporation of possibly generalized additional conditions within rules implementing narrower applicability conditions where such additional conditions originate within broader antecedent conditions and/or antecedents of consequent sentences, the rule could be implemented as (1) (indicated "A" ?x ?y)=>(A ?x ?y)
(2) (indicated "B" ?x ?y) (B ?x)=>(indicated "A" ?x ?y)
(3) (B ?x) (C ?x ?y)=>(indicated "B" ?x ?y)

Note that this rule could assert A as indicated directly given that only a single antecedent condition exists for B.

Although the present invention may apply various optimizations to rule generation, such as in the case of a consequent sentence or antecedent condition having no more than a single antecedent condition, the present invention typically generates a single rule per composition of an antecedent condition (DNF is not typically required due to the expressiveness of the Eclipse syntax), whether composed with another antecedent condition or a consequent sentence.

Such rules may be generated such that multiple rules with a common antecedent may share the antecedent by various techniques, including common prefixes, as in the Rete Algorithm, or inner joins. Further, such rules may be generated such that no join computation occurs (e.g., within the Rete Algorithm) for antecedent conditions that are

- a) composed in sentences in modules, or sets of rules, that are not applicable
- b) have no applicable indicated sufficient conditions
- c) have an indicated necessary condition that is not applicable
- d) have an indicated contraindicating condition that is applicable
- e) all of which are typically implemented by including patterns that must be satisfied before the join computations of the rule that would be generated first above are incurred (in the case of the Rete Algorithm).

Such rules may also be generated so as to limit their execution and computation expense using backward chaining triggered by sub-goals from the rules implementing antecedent conditions or consequent sentences. This may avoid join computations as listed above but also if the goal generating rule is inapplicable per above, thereby limiting extraneous forward chaining and join computation which these variables participate in specific conditions. Even when maxima cannot be grounded numerically, they can be used abstractly to determine that one potential ordering of bindings is superior to another empirically from a deployed system.

The present invention may use backward chaining in the determination whether a condition is applicable and satisfied. Backward chaining allows unnecessary computation to be avoided. For example, in "(goal (condition "B" ?x)) (B ?x)=> (infer (condition "B" ?x))" where the computation of B is triggered only when another rule needs to know whether condition B is satisfied. If the computation of B is costly, backward chaining avoids the computation when its result is not needed. If the variable ?x is bound before the reference to condition B in a rule of which B is a condition, then backward chaining further restricts B's computation to those values of ?x for which bindings are provided. Consider the following three-rule example, which achieves huge savings in the case where few values of ?x satisfy B, but many values satisfy C:

(1) (condition "B" ?x) (condition "C" ?x)=>(A ?x)
(2) (goal (condition "B" ?x)) (B ?x)=>(infer (condition "B" ?x))
(3) (goal (condition "C" ?x))(C ?x)=>(inter (condition "C" ?x))

The present invention decides for each condition whether to use forward or backward chaining. Backward chaining should be used when it is likely that unnecessary computation will be avoided thereby. Forward chaining should be used when backward chaining is not expected to eliminate any inferences, because forward chaining is more efficient than backward chaining for the same set of inferences.

EXAMPLE XIV

Implementing Non-Propositional Consequents As Rules

In an embodiment where a reference in the consequent cannot be resolved in the antecedent other than by universal quantification and the quantification cannot be re-interpreted as enumerative, and if the consequent does not involve action semantics, then the negated consequent can be conjoined with the antecedent while converting the universal quantification to existential in rules that recognize logical inconsistency. That is, the following are logically equivalent (assuming action semantics do not follow the implication):

(1) ForAll(x) {F(x) implies G(x)}
(2) Not(Exists(x) {F(x) and Not(G(x))})

Note that a natural language sentence interpreted as in the first formula could also be interpreted (i.e., by parsing the English) using enumerative quantification and implemented as a rule, such as follows:

(1) ForEach(x) {F(x) implies G(x)}
(2) (defrule 6 (F ?x)=>(infer (G ?x)))

In another example, the following are logically equivalent:
(1) ForAll(x) {F(x) implies ForAll(y) {G(y) implies H(x, y)}}
(2) Not(Exists(x) {F(x) and Exists(y) {G(y)) and Not(H(x, y))}})

The resulting formula becomes the antecedent for rule generation where the consequent is an action that notes the logical inconsistency (e.g., as a runtime exception.) For example, "every man is male" as "if a man is not male then throw an exception." Alternatively, the exception may be handled by indicating that at least one of the axioms (e.g., propositional facts) leads to the inconsistency and, specifically, in the context of a user interface, the most recent fact(s) should be reconsidered unless prior inputs, if any, are revised.

In an embodiment where a reference in the consequent cannot be resolved in the antecedent other than by existential quantification then the negated consequent can be conjoined with the antecedent in rules that recognize logical inconsistency. That is, the following are logically equivalent:

(1) Exists(x) {F(x) implies G(x)}
(2) Not(ForAll(x) {F(x) and Not(G(x))})

The following are logically equivalent:
(1) Exists(x) {F(x) implies Exists(y) {G(x,y)}}
(2) Not(ForAll(x) {F(x) and Not(Exists(y) {G(x,y)})})

The resulting formula becomes the antecedent for rule generation where the consequent is an action that nodes the logical inconsistency (e.g., as a runtime exception.)

In an embodiment where a consequent involves negation, the un-negated consequent may be conjoined with the antecedent of the formula in rules that recognize logical inconsistency at runtime as described further above. That is, the following are logically equivalent (1) ForEach(x) {F(x) implies not G(x)}
(2) Not(Exists(x) {F(x) and G(x)})

The resulting formula becomes the antecedent for rule generation where the consequent is an action that notes the logical inconsistency (e.g., as a runtime exception.).

In an embodiment where a consequent involves negation of a grounded tuple (i.e., concludes that a proposition is not valid) then the rules resulting from conjunction of the negated consequent with the antecedent of the formula may, alternatively, assert the negative conclusion (i.e., that something is not the case). This may be implemented within the rule engine if it supports a truth value for propositions or by the assertion of meta-model information, such as the allowed or disallowed value of a role in relation (e.g., an attribute of an object). For example, (defrelation disallowed (?value ?attribute $?))

The following logic could be implemented in the following rule:

(1) ForAll(x) {A(x) implies Not(G(x))}
(2) (defrule 7 (A x)>(infer (disallowed x G)))

The existence of such negative conclusions may have specific utility in user interfaces, such as eliminating choices from possible values and/or deducing the value for an attribute. For example, if a possible value for an attribute is the only possible value for that attribute that is not disallowed then the possible value must be the value for the attribute. Another example is where a possible value for an attribute as an HTML option is output if and only if it is not disallowed for the attribute. Note that the positive assertion of a proposition with a single negated term corresponds to the negation of the same proposition with the un-negated term.

In an embodiment where a consequent involves disjunction of grounded tuples (i.e., concludes that at least one of some propositions must hold) then the rules may assert the disjunctive conclusions, optionally in addition to the exception recognition logic. This may be implemented within the rule engine if it supports a proposition being disjunctive (i.e., participating in any number of disjunctions, including as in an assumptive truth maintenance system, i.e., an ATMS) or by the assertion of higher order logic information, especially the assertion that the allowed or disallowed value of a role in a relation (e.g., an attribute of an object) participates in a disjunction of such constraints. For example, (defrelation disjunction (?values ?attribute $?))

The following logic could be implemented in the following rule:

(1) ForAll(x) {A(x, y) implies G(x or y)}
(2) (defrule 8 (A ?x ?y)=>(infer (disjunction (?x ?y) G)))

The existence of such disjunctive conclusions may have specific utility in user interfaces, such as eliminating and/or specifying choices for the possible value(s) of an attribute of an object. Such elimination and specification may combine to yield only a single possibility which may then be deduced using meta-logic (e.g., a rule). For example, if a disjunctive value for an attribute is the only possible value for that attribute that has not been disallowed then the disjunctive value must be the value for the attribute. Further, such elimination may combine to indicate no possible value which, in the case that an attribute must have a value, be recognized by meta-logic (e.g., a rule) as a logical inconsistency. For example, if every disjunctive value for an attribute has been disallowed for the attribute then the logic is inconsistent (e.g., signal a runtime exception.)

Although this invention has been described with reference to particular embodiments, it will be appreciated that many variations may be resorted to without departing from the spirit and scope of this invention. For example, the information represented by the query engine as herein described may be stored in a plurality of relational databases, or could even be stored in some other temporary or permanent memory system, such as RAM, EEPROMs, etc., and is not particularly limited. The software system of the present invention may be adapted to operate on any software platform, such as Microsoft Windows, various versions of UNIX, Apple Macintosh, and is also not particularly limited.

We claim:

1. A method for creating a sentence in a natural language understanding interface, said method comprising:
   providing, by a computer system, at least one base sentence;
   providing, by said computer system, at least one condition;
   providing, by said computer system, at least one connective;
   appending, by said computer system, said at least one base sentence to said at least one connective; and
   appending, by said computer system, said base sentence and connective to said at least one condition to create a composite sentence,
   wherein said composite sentence is an object in a natural language understanding interface.

2. The method of claim 1, wherein said condition is either an antecedent condition or a consequent condition.

3. The method of claim 2, wherein said condition is a consequent condition, and wherein said consequent condition further comprises an antecedent condition.

4. The method of claim 1, further comprising:
   interpreting, by said computer system, said composite sentence as a logical formula in a logic formalism supporting conjunction, disjunction, negation, and variables.

5. The method of claim 4, wherein said logic formalism comprises first order predicate calculus.

6. The method of claim 4, wherein said variables comprise existentially and universally quantified variables.

7. The method of claim 1, wherein said composite sentence comprises natural language, said method further comprising:
   interpreting, by said computer system, said natural language, including singular common count noun phrases and connectives, as variables in formal logic.

8. The method of claim 7, wherein said interpreting comprises implementing logical interpretations as rules.

9. A system for creating a sentence in a natural language understanding interface, said system comprising:
   a processor configured to:
      provide at least one base sentence;
      provide at least one condition;
      provide at least one connective;
      append said at least one base sentence to said at least one connective; and
      append said base sentence and connective to said at least one condition to create a composite sentence,
      wherein said composite sentence is an object in a natural language understanding interface.

10. The system of claim 9, wherein said condition is either an antecedent condition or a consequent condition.

11. The system of claim 10, wherein said condition is a consequent condition, and wherein said consequent condition further comprises an antecedent condition.

12. The system of claim 9, further comprising:
   interpreting, by said computer system, said composite sentence as a logical formula in a logic formalism supporting conjunction, disjunction, negation, and variables.

13. The system of claim 12, wherein said logic formalism comprises first order predicate calculus.

14. The system of claim 12, wherein said variables comprise existentially and universally quantified variables.

15. The system of claim 9, wherein said composite sentence comprises natural language, and said processor is further configured to:
   interpret said natural language, including singular common count noun phrases and connectives, as variables in formal logic.

16. The system of claim 15, wherein said processor configured to interpret said natural language is further configured to implement logical interpretations as rules.

17. A non-transitory machine-readable medium for a computer system, said non-transitory machine-readable medium having stored thereon a series of instructions executable by a processor for creating a sentence in a natural language understanding interface, said series of instructions comprising:
   instructions that cause said processor to provide at least one base sentence;
   instructions that cause said processor to provide at least one condition;
   instructions that cause said processor to provide at least one connective;
   instructions that cause said processor to append said at least one base sentence to said at least one connective; and
   instructions that cause said processor to append said base sentence and connective to said at least one condition to create a composite sentence,
   wherein said composite sentence is an object in a natural language understanding interface.

18. The machine-readable medium of claim 17, wherein said condition is either an antecedent condition or a consequent condition.

19. The machine-readable medium of claim 18, wherein said condition is a consequent condition, and wherein said consequent condition further comprises an antecedent condition.

20. The machine-readable medium of claim 17, said series of instructions further comprising:
   instructions that cause said processor to interpret said composite sentence as a logical formula in a logic formalism supporting conjunction, disjunction, negation, and variables.

* * * * *

UNITED STATES PATENT AND TRADEMARK OFFICE
CERTIFICATE OF CORRECTION

PATENT NO. : 8,135,576 B2
APPLICATION NO. : 11/718129
DATED : March 13, 2012
INVENTOR(S) : Haley et al.

It is certified that error appears in the above-identified patent and that said Letters Patent is hereby corrected as shown below:

In column 2, line 49, delete "Fulcruin," and insert -- Fulcrum, --, therefor.

In column 3, line 41, delete "polices" and insert -- policies --, therefor.

In column 11, line 78, delete "quoutient" and insert -- quotient --, therefor.

In column 25, line 65, delete "ry" and insert -- every --, therefor.

In column 26, line 6, after "bindings." delete "and".

In column 27, line 67, delete "reference)" and insert -- reference). --, therefor.

In column 31, line 3, delete "two" and insert -- two. --, therefor.

In column 31, line 14, delete "factors" and insert -- factors. --, therefor.

In column 33, line 63, delete "accordingly" and insert -- accordingly. --, therefor.

In column 34, line 16, delete "tuple." and insert -- tuple --, therefor.

In column 36, line 67, delete "condition" and insert -- condition. --, therefor.

In column 38, line 8, delete "all or the" and insert -- all of the --, therefor.

In column 40, line 12, delete "or the" and insert -- of the --, therefor.

In column 44, line 12, delete "each." and insert -- each --, therefor.

In column 46, line 23, delete "(3 ?x)" and insert -- (B ?x) --, therefor.

In column 48, line 9, delete "Not(ForAil(x)" and insert -- Not(ForAll(x) --, therefor.

Signed and Sealed this
Twenty-ninth Day of May, 2012

David J. Kappos
*Director of the United States Patent and Trademark Office*